United States Patent
Wang et al.

(10) Patent No.: US 11,871,130 B2
(45) Date of Patent: Jan. 9, 2024

(54) COMPACT PERCEPTION DEVICE

(71) Applicant: Innovusion, Inc., Sunnyvale, CA (US)

(72) Inventors: Haosen Wang, Sunnyvale, CA (US); Yimin Li, Cupertino, CA (US)

(73) Assignee: INNOVUSION, INC., Sunnyvale, CA (US)

( * ) Notice: Subject to any disclaimer, the term of this patent is extended or adjusted under 35 U.S.C. 154(b) by 0 days.

(21) Appl. No.: 18/105,781

(22) Filed: Feb. 3, 2023

(65) Prior Publication Data
US 2023/0328403 A1    Oct. 12, 2023

Related U.S. Application Data

(60) Provisional application No. 63/323,962, filed on Mar. 25, 2022.

(51) Int. Cl.
*H04N 25/70* (2023.01)
*G01S 17/89* (2020.01)
*H04N 25/20* (2023.01)

(52) U.S. Cl.
CPC ............. *H04N 25/70* (2023.01); *G01S 17/89* (2013.01); *H04N 25/20* (2023.01)

(58) Field of Classification Search
CPC ......... H04N 25/70; H04N 25/20; G01S 17/89
See application file for complete search history.

(56) References Cited

U.S. PATENT DOCUMENTS

| | | | |
|---|---|---|---|
| 3,897,150 A | 7/1975 | Bridges et al. |
| 4,464,048 A | 8/1984 | Farlow |
| 5,006,721 A | 4/1991 | Cameron et al. |
| 5,157,451 A | 10/1992 | Taboada |

(Continued)

FOREIGN PATENT DOCUMENTS

| CN | 1677050 A | 10/2005 |
|---|---|---|
| CN | 204758260 U | 11/2015 |

(Continued)

OTHER PUBLICATIONS

Chen, X. et al. (Feb. 2010). "Polarization Coupling of Light and Optoelectronics Devices Based on Periodically Poled Lithium Niobate," Shanghai Jiao Tong University, China, Frontiers in Guided Wave Optics and Optoelectronics, 24 pages.

(Continued)

*Primary Examiner* — Gevell V Selby
(74) *Attorney, Agent, or Firm* — Mauriel Kapouytian Woods LLP; Liang Huang

(57) ABSTRACT

A compact perception device for an autonomous driving system is disclosed. The compact perception device includes a lens configured to collect both visible light and near infrared (NIR) light to obtain collected light including collected visible light and collected NIR light. The device further includes a first optical reflector optically coupled to the lens. The first optical reflector is configured to reflect one of the collected visible light or the collected NIR light, and pass the collected light that is not reflected by the first optical reflector. The device further includes an image sensor configured to detect the collected visible light directed by the first optical reflector to form image data; and a depth sensor configured to detect the collected NIR light directed by the first optical reflector to form depth data.

22 Claims, 14 Drawing Sheets

(56) References Cited

U.S. PATENT DOCUMENTS

| | | |
|---|---|---|
| 5,319,434 A | 6/1994 | Croteau et al. |
| 5,369,661 A | 11/1994 | Yamaguchi et al. |
| 5,442,358 A | 8/1995 | Keeler et al. |
| 5,546,188 A | 8/1996 | Wangler et al. |
| 5,579,153 A | 11/1996 | Laming et al. |
| 5,657,077 A | 8/1997 | Deangelis et al. |
| 5,793,491 A | 8/1998 | Wangler et al. |
| 5,838,239 A | 11/1998 | Stern et al. |
| 5,864,391 A | 1/1999 | Hosokawa et al. |
| 5,926,259 A | 7/1999 | Bamberger et al. |
| 5,936,756 A | 8/1999 | Nakajima |
| 6,163,378 A | 12/2000 | Khoury |
| 6,317,202 B1 | 11/2001 | Hosokawa et al. |
| 6,594,000 B2 | 7/2003 | Green et al. |
| 6,650,404 B1 | 11/2003 | Crawford |
| 6,950,733 B2 | 9/2005 | Stopczynski |
| 7,128,267 B2 | 10/2006 | Reichenbach et al. |
| 7,202,941 B2 | 4/2007 | Munro |
| 7,345,271 B2 | 3/2008 | Boehlau et al. |
| 7,375,803 B1 * | 5/2008 | Bamji ............... H04N 25/131 356/4.01 |
| 7,440,084 B2 | 10/2008 | Kane |
| 7,440,175 B2 | 10/2008 | Di et al. |
| 7,489,885 B2 | 2/2009 | Varshneya et al. |
| 7,576,837 B2 | 8/2009 | Liu et al. |
| 7,830,527 B2 | 11/2010 | Chen et al. |
| 7,835,068 B1 | 11/2010 | Brooks et al. |
| 7,847,235 B2 | 12/2010 | Krupkin et al. |
| 7,880,865 B2 | 2/2011 | Tanaka et al. |
| 7,936,448 B2 | 5/2011 | Albuquerque et al. |
| 7,969,558 B2 | 6/2011 | Hall |
| 7,982,881 B2 | 7/2011 | Abshire et al. |
| 8,072,582 B2 | 12/2011 | Meneely |
| 8,471,895 B2 | 6/2013 | Banks |
| 8,736,818 B2 | 5/2014 | Weimer et al. |
| 8,749,784 B1 | 6/2014 | Hsu |
| 8,812,149 B2 | 8/2014 | Doak |
| 8,994,928 B2 | 3/2015 | Shiraishi |
| 9,048,616 B1 | 6/2015 | Robinson |
| 9,065,243 B2 | 6/2015 | Asobe et al. |
| 9,086,273 B1 | 7/2015 | Gruver et al. |
| 9,194,701 B2 | 11/2015 | Bosch |
| 9,255,790 B2 | 2/2016 | Zhu |
| 9,300,321 B2 | 3/2016 | Zalik et al. |
| 9,304,316 B2 | 4/2016 | Weiss et al. |
| 9,316,724 B2 | 4/2016 | Gehring et al. |
| 9,354,485 B2 | 5/2016 | Fermann et al. |
| 9,510,505 B2 | 12/2016 | Halloran et al. |
| 9,557,856 B2 * | 1/2017 | Send ...................... G01S 11/12 |
| 9,575,184 B2 | 2/2017 | Gilliland et al. |
| 9,605,998 B2 | 3/2017 | Nozawa |
| 9,621,876 B2 | 4/2017 | Federspiel |
| 9,638,799 B2 | 5/2017 | Goodwin et al. |
| 9,696,426 B2 | 7/2017 | Zuk |
| 9,702,966 B2 | 7/2017 | Batcheller et al. |
| 9,804,264 B2 | 10/2017 | Villeneuve et al. |
| 9,804,284 B2 | 10/2017 | Villeneuve et al. |
| 9,610,786 B2 | 11/2017 | Welford et al. |
| 9,812,838 B2 | 11/2017 | Villeneuve et al. |
| 9,823,353 B2 | 11/2017 | Eichenholz et al. |
| 9,857,468 B1 | 1/2018 | Eichenholz et al. |
| 9,869,754 B1 | 1/2018 | Campbell et al. |
| 9,880,278 B2 | 1/2018 | Uffelen et al. |
| 9,880,283 B2 | 1/2018 | Droz et al. |
| 9,885,778 B2 | 2/2018 | Dussan |
| 9,897,689 B2 | 2/2018 | Dussan |
| 9,915,726 B2 | 3/2018 | Bailey et al. |
| 9,927,915 B2 | 3/2018 | Frame et al. |
| 9,958,545 B2 | 5/2018 | Eichenholz et al. |
| 10,007,001 B1 | 6/2018 | LaChapelle et al. |
| 10,012,732 B2 | 7/2018 | Eichenholz et al. |
| 10,042,159 B2 | 8/2018 | Dussan et al. |
| 10,061,019 B1 | 8/2018 | Campbell et al. |
| 10,073,166 B2 | 9/2018 | Dussan |
| 10,078,133 B2 | 9/2018 | Dossan |
| 10,094,925 B1 | 10/2018 | LaChapelle |
| 10,157,630 B2 | 12/2018 | Vaughn et al. |
| 10,191,155 B2 | 1/2019 | Curatu |
| 10,215,847 B2 | 2/2019 | Scheim et al. |
| 10,267,898 B2 | 4/2019 | Campbell et al. |
| 10,295,656 B1 | 5/2019 | Li et al. |
| 10,310,058 B1 | 6/2019 | Campbell et al. |
| 10,324,170 B1 | 6/2019 | Enberg, Jr. et al. |
| 10,324,185 B2 | 6/2019 | McWhirter et al. |
| 10,393,877 B2 | 8/2019 | Hall et al. |
| 10,397,497 B1 | 8/2019 | Graves et al. |
| 10,429,495 B1 | 10/2019 | Wang et al. |
| 10,444,356 B2 | 10/2019 | Wu et al. |
| 10,451,716 B2 | 10/2019 | Hughes et al. |
| 10,466,342 B1 | 11/2019 | Zhu et al. |
| 10,502,831 B2 | 12/2019 | Eichenholz |
| 10,509,112 B1 | 12/2019 | Pan |
| 10,520,602 B2 | 12/2019 | Villeneuve et al. |
| 10,557,923 B2 | 2/2020 | Watnik et al. |
| 10,571,567 B2 | 2/2020 | Campbell et al. |
| 10,578,720 B2 | 3/2020 | Hughes et al. |
| 10,591,600 B2 | 3/2020 | Villeneuve et al. |
| 10,627,491 B2 | 4/2020 | Hall et al. |
| 10,641,872 B2 | 5/2020 | Dussan et al. |
| 10,663,564 B2 | 5/2020 | LaChapelle |
| 10,663,585 B2 | 5/2020 | McWhirter |
| 10,663,596 B2 | 5/2020 | Dussan et al. |
| 10,684,360 B2 | 6/2020 | Campbell |
| 10,908,262 B2 | 2/2021 | Dussan |
| 10,908,265 B2 | 2/2021 | Dussan |
| 10,908,268 B2 | 2/2021 | Zhou et al. |
| 10,969,475 B2 | 4/2021 | Li et al. |
| 10,983,218 B2 | 4/2021 | Hall et al. |
| 11,002,835 B2 | 5/2021 | Pan et al. |
| 11,009,805 B2 | 5/2021 | Li et al. |
| 11,194,048 B1 | 12/2021 | Burbank et al. |
| 2002/0136251 A1 | 9/2002 | Green et al. |
| 2004/0119020 A1 | 6/2004 | Bodkin |
| 2004/0135992 A1 | 7/2004 | Munro |
| 2005/0033497 A1 | 2/2005 | Stopczynski |
| 2005/0190424 A1 | 9/2005 | Reichenbach et al. |
| 2005/0195383 A1 | 9/2005 | Breed et al. |
| 2006/0071846 A1 | 4/2006 | Yanagisawa et al. |
| 2006/0132752 A1 | 6/2006 | Kane |
| 2007/0091948 A1 | 4/2007 | Di et al. |
| 2007/0216995 A1 | 9/2007 | Bollond et al. |
| 2008/0174762 A1 | 7/2008 | Liu et al. |
| 2008/0193135 A1 | 8/2008 | Du et al. |
| 2009/0010644 A1 | 1/2009 | Varshneya et al. |
| 2009/0051926 A1 | 2/2009 | Chen |
| 2009/0059201 A1 | 3/2009 | Willner et al. |
| 2009/0067453 A1 | 3/2009 | Mizuuchi et al. |
| 2009/0147239 A1 | 6/2009 | Zhu |
| 2009/0262760 A1 | 10/2009 | Krupkin et al. |
| 2009/0316134 A1 | 12/2009 | Michael et al. |
| 2010/0006780 A1 | 1/2010 | Lee et al. |
| 2010/0020306 A1 | 1/2010 | Hall |
| 2010/0020377 A1 | 1/2010 | Borchers et al. |
| 2010/0027602 A1 | 2/2010 | Abshire et al. |
| 2010/0045965 A1 | 2/2010 | Meneely |
| 2010/0053715 A1 | 3/2010 | O'Neill et al. |
| 2010/0128109 A1 | 5/2010 | Banks |
| 2010/0208244 A1 | 8/2010 | Earhart et al. |
| 2010/0271614 A1 | 10/2010 | Albuquerque et al. |
| 2011/0181864 A1 | 7/2011 | Schmitt et al. |
| 2012/0038903 A1 | 2/2012 | Weimer et al. |
| 2012/0044476 A1 | 2/2012 | Earhart et al. |
| 2012/0124113 A1 | 5/2012 | Zalik et al. |
| 2012/0221142 A1 | 8/2012 | Doak |
| 2013/0107016 A1 | 5/2013 | Federspiel |
| 2013/0116971 A1 | 5/2013 | Retkowski et al. |
| 2013/0241781 A1 | 9/2013 | Cooper et al. |
| 2013/0293867 A1 | 11/2013 | Hsu et al. |
| 2013/0293946 A1 | 11/2013 | Fermann et al. |
| 2013/0329279 A1 | 12/2013 | Nati et al. |
| 2013/0342822 A1 | 12/2013 | Shiraishi |
| 2014/0078514 A1 | 3/2014 | Zhu |
| 2014/0104594 A1 | 4/2014 | Gammenthaler |
| 2014/0347850 A1 | 11/2014 | Bosch |

(56) References Cited

U.S. PATENT DOCUMENTS

| | | |
|---|---|---|
| 2014/0350836 A1 | 11/2014 | Stettner et al. |
| 2015/0078123 A1 | 3/2015 | Batcheller et al. |
| 2015/0084805 A1 | 3/2015 | Dawber |
| 2015/0109803 A1 | 4/2015 | Kim et al. |
| 2015/0116692 A1 | 4/2015 | Zuk et al. |
| 2015/0139259 A1 | 5/2015 | Robinson |
| 2015/0158489 A1 | 6/2015 | Oh et al. |
| 2015/0338270 A1 | 11/2015 | Williams et al. |
| 2015/0355327 A1 | 12/2015 | Goodwin et al. |
| 2016/0003946 A1 | 1/2016 | Gilliland et al. |
| 2016/0047896 A1 | 2/2016 | Dussan |
| 2016/0047900 A1 | 2/2016 | Dussan |
| 2016/0061855 A1 | 3/2016 | Nozawa |
| 2016/0061935 A1 | 3/2016 | Mccloskey et al. |
| 2016/0100521 A1 | 4/2016 | Halloran et al. |
| 2016/0117048 A1 | 4/2016 | Frame et al. |
| 2016/0172819 A1 | 6/2016 | Ogaki |
| 2016/0178736 A1 | 6/2016 | Chung |
| 2016/0226210 A1 | 8/2016 | Zayhowski et al. |
| 2016/0227193 A1 | 8/2016 | Osterwood et al. |
| 2016/0245902 A1 | 8/2016 | Natnik |
| 2016/0291134 A1 | 10/2016 | Droz et al. |
| 2016/0313445 A1 | 10/2016 | Bailey et al. |
| 2016/0327646 A1 | 11/2016 | Scheim et al. |
| 2017/0003116 A1 | 1/2017 | Yee et al. |
| 2017/0003392 A1 | 1/2017 | Bartlett et al. |
| 2017/0153319 A1 | 6/2017 | Villeneuve et al. |
| 2017/0242104 A1 | 8/2017 | Dussan |
| 2017/0299721 A1 | 10/2017 | Eichenholz et al. |
| 2017/0307738 A1 | 10/2017 | Schwarz et al. |
| 2017/0363741 A1 | 12/2017 | Send et al. |
| 2017/0365105 A1 | 12/2017 | Rao et al. |
| 2018/0040171 A1 | 2/2018 | Kundu et al. |
| 2018/0050704 A1 | 2/2018 | Tascione et al. |
| 2018/0069367 A1 | 3/2018 | Villeneuve et al. |
| 2018/0113200 A1 | 4/2018 | Steinberg et al. |
| 2018/0152691 A1 | 5/2018 | Pacala et al. |
| 2018/0164439 A1 | 6/2018 | Droz et al. |
| 2018/0180733 A1 | 6/2018 | Smits |
| 2018/0156896 A1 | 7/2018 | O'Keeffe |
| 2018/0188355 A1 | 7/2018 | Bao et al. |
| 2018/0188357 A1 | 7/2018 | Li et al. |
| 2018/0188358 A1 | 7/2018 | Li et al. |
| 2018/0188371 A1 | 7/2018 | Bao et al. |
| 2018/0205859 A1 | 7/2018 | Dornblut et al. |
| 2018/0210064 A1 | 7/2018 | Send et al. |
| 2018/0210084 A1 | 7/2018 | Zwölfer et al. |
| 2018/0158471 A1 | 8/2018 | Vaughn et al. |
| 2018/0275274 A1 | 9/2018 | Bao et al. |
| 2018/0284241 A1 | 10/2018 | Campbell et al. |
| 2018/0284242 A1 | 10/2018 | Campbell |
| 2018/0284286 A1 | 10/2018 | Eichenholz et al. |
| 2018/0329060 A1 | 11/2018 | Pacala et al. |
| 2018/0359460 A1 | 12/2018 | Pacala et al. |
| 2019/0025428 A1 | 1/2019 | Li et al. |
| 2019/0107607 A1 | 4/2019 | Danziger |
| 2019/0107623 A1 | 4/2019 | Campbell et al. |
| 2019/0120942 A1 | 4/2019 | Zhang et al. |
| 2019/0120962 A1 | 4/2019 | Gimpel et al. |
| 2019/0154804 A1 | 5/2019 | Eichenholz |
| 2019/0154807 A1 | 5/2019 | Steinkogler et al. |
| 2019/0166355 A1* | 5/2019 | Banks ................ H04N 23/74 |
| 2019/0212416 A1 | 7/2019 | Li et al. |
| 2019/0250254 A1 | 8/2019 | Campbell et al. |
| 2019/0257924 A1 | 8/2019 | Li et al. |
| 2019/0265334 A1 | 8/2019 | Zhang et al. |
| 2019/0265336 A1 | 8/2019 | Zhang et al. |
| 2019/0265337 A1 | 8/2019 | Zhang et al. |
| 2019/0265339 A1 | 8/2019 | Zhang et al. |
| 2019/0277952 A1 | 9/2019 | Beuschel et al. |
| 2019/0310368 A1 | 10/2019 | LaChapelle |
| 2019/0369215 A1 | 12/2019 | Wang et al. |
| 2019/0369258 A1 | 12/2019 | Hall et al. |
| 2019/0376890 A1 | 12/2019 | Bennett et al. |
| 2019/0383915 A1 | 12/2019 | Li et al. |
| 2020/0142070 A1 | 5/2020 | Hall et al. |
| 2020/0256964 A1 | 8/2020 | Campbell et al. |
| 2020/0260066 A1* | 8/2020 | Liu ..................... H04N 13/296 |
| 2020/0284906 A1 | 9/2020 | Eichenholz et al. |
| 2020/0319310 A1 | 10/2020 | Hall et al. |
| 2020/0400798 A1 | 12/2020 | Rezk et al. |
| 2021/0088630 A9 | 3/2021 | Zhang |

FOREIGN PATENT DOCUMENTS

| | | |
|---|---|---|
| CN | 204885804 U | 12/2015 |
| CN | 108132472 A | 6/2018 |
| CN | 207457508 U | 6/2018 |
| CN | 207557465 U | 6/2018 |
| CN | 206314210 U | 1/2019 |
| CN | 208421228 U | 1/2019 |
| CN | 208705506 U | 4/2019 |
| CN | 108597471 B | 5/2019 |
| CN | 209280923 U | 8/2019 |
| CN | 108445468 B | 11/2019 |
| CN | 110031823 B | 3/2020 |
| CN | 108089201 B | 4/2020 |
| CN | 109116331 B | 4/2020 |
| CN | 109917408 B | 4/2020 |
| CN | 109116366 B | 5/2020 |
| CN | 109116367 B | 5/2020 |
| CN | 110031822 B | 5/2020 |
| CN | 211655309 U | 10/2020 |
| CN | 109188397 B | 11/2020 |
| CN | 109814086 B | 11/2020 |
| CN | 109917348 B | 11/2020 |
| CN | 110492856 B | 11/2020 |
| CN | 110736975 B | 11/2020 |
| CN | 109725320 B | 12/2020 |
| CN | 110780284 B | 12/2020 |
| CN | 110780283 B | 1/2021 |
| CN | 110784220 B | 2/2021 |
| CN | 212623082 U | 2/2021 |
| CN | 110492349 B | 3/2021 |
| CN | 109950784 B | 5/2021 |
| CN | 213182011 U | 5/2021 |
| CN | 213750313 U | 7/2021 |
| CN | 214151038 U | 9/2021 |
| CN | 109814082 B | 10/2021 |
| CN | 113491043 A | 10/2021 |
| CN | 214795200 U | 11/2021 |
| CN | 214795206 U | 11/2021 |
| CN | 214895784 U | 11/2021 |
| CN | 214895810 U | 11/2021 |
| CN | 215641806 U | 1/2022 |
| CN | 112639527 B | 2/2022 |
| CN | 215932142 U | 3/2022 |
| CN | 112578396 B | 4/2022 |
| EP | 0 757 257 B1 | 2/1997 |
| EP | 1 237 305 A2 | 9/2002 |
| EP | 1 923 721 A1 | 5/2008 |
| EP | 2 157 445 A2 | 2/2010 |
| EP | 2 395 368 A1 | 12/2011 |
| EP | 2 889 642 A1 | 7/2015 |
| EP | 3477338 A1 | 5/2019 |
| GB | 1 427 164 A | 3/1976 |
| GB | 2000411 | 1/1979 |
| JP | 2007144667 A | 6/2007 |
| JP | 2010035385 A | 2/2010 |
| JP | 2017-003347 A | 1/2017 |
| JP | 2017-138301 A | 8/2017 |
| KR | 10-2012-0013515 A | 2/2012 |
| KR | 10-2013-0068224 | 6/2013 |
| KR | 10-2018-0107673 A | 10/2018 |
| WO | 2017/110417 A1 | 6/2017 |
| WO | 2018/125725 A1 | 7/2018 |
| WO | 2018/129410 A1 | 7/2018 |
| WO | 2018129408 A1 | 7/2018 |
| WO | 2018129409 A1 | 7/2018 |
| WO | 2018129410 A1 | 7/2018 |
| WO | 2018175990 | 9/2018 |
| WO | 2018182812 A2 | 10/2018 |
| WO | 2019079642 | 4/2019 |
| WO | 2019165095 | 8/2019 |

(56) References Cited

FOREIGN PATENT DOCUMENTS

| WO | 2019165289 A1 | 8/2019 |
|---|---|---|
| WO | 2019165294 | 8/2019 |
| WO | 2020013890 A2 | 1/2020 |

OTHER PUBLICATIONS

Goldstein, R. (Apr. 1986) "Electro-Optic Devices in Review, The Linear Electro-Optic (Pockels) Effect Forms the Basis for a Family of Active Devices," Laser & Applications, FastPulse Technology, Inc., 6 pages.
International Preliminary Report on Patentability, dated Jul. 9, 2019, for International Application No. PCT/US2018/012703, 10 pages.
International Preliminary Report on Patentability, dated Jul. 9, 2019, for International Application No. PCT/US2018/012704, 7 pages.
International Preliminary Report on Patentability, dated Jul. 9, 2019, for International Application No. PCT/US2018/012705, 7 pages.
International Search Report and Written Opinion, dated Jan. 17, 2020, for International Application No. PCT/US2019/019276, 14 pages.
International Search Report and Written Opinion, dated Jul. 9, 2019, for International Application No. PCT/US2019/018987, 17 pages.
International Search Report and Written Opinion, dated Sep. 18, 2018, for International Application No. PCT/US2018/012116, 12 pages.
International Search Report and Written Opinion, dated May 3, 2019, for International Application No. PCT/US2019/019272, 16 pages.
International Search Report and Written Opinion, dated May 6, 2019, for International Application No. PCT/US2019/019264, 15 pages.
International Search Report and Written Opinion, dated Jan. 3, 2019, for International Application No. PCT/US2018/056577, 15 pages.
International Search Report and Written Opinion, dated Mar. 23, 2018, for International Application No. PCT/US2018/012704, 12 pages.
International Search Report and Written Opinion, dated Jun. 7, 2018, for International Application No. PCT/US2018/024185, 9 pages.
International Preliminary Report on Patentability, dated Apr. 30, 2020, for International Application No. PCT/US2018/056577, 8 pages.
European Search Report, dated Jul. 17, 2020, for EP Application No. 18776977.3, 12 pages.
Extended European Search Report, dated Jul. 10, 2020, for EP Application No. 18736738.8, 9 pages.
Gunzung, Kim, et al. (Mar. 2, 2018). "A hybrid 3D LIDAR imager based on pixel-by-pixel scanning and DS-OCDMA," pages Proceedings of SPIE [Proceedings of SPIE ISSN 0277-786X vol. 10524], SPIE, US, vol. 9751, pp. 975119-975119-8.
Extended European Search Report, dated Jul. 22, 2020, for EP Application No. 18736685.1, 10 pages.
Gluckman, J. (May 13, 2016). "Design of the processing chain for a high-altitude, airborne, single-photon lidar mapping instrument," Proceedings of SPIE; [Proceedings of SPIE ISSN 0277-786X vol. 10524], SPIE, US, vol. 9832, 9 pages.
Office Action Issued in Japanese Patent Application No. 2019-536019 dated Nov. 30, 2021, 6 pages.
European Search Report, dated Jun. 17, 2021, for EP Application No. 18868896.4, 7 pages.
"Fiber laser," Wikipedia, https://en.wikipedia.org/wiki/Fiber_laser, 6 pages.
International Search Report and Written Opinion, dated Mar. 19, 2018, for International Application No. PCT/US2018/012705, 12 pages.
International Search Report and Written Opinion, dated Mar. 20, 2018, for International Application No. PCT/US2018/012703, 13 pages.
"Mirrors", Physics LibreTexts, https://phys.libretexts.org/Bookshelves/Optics/Supplemental_Modules_(Components)/Mirrors, (2021), 2 pages.
"Why Wavelengths Matter in Fiber Optics", FirstLight, https://www.firstlight.net/why-wavelengths-matter-in-fiber-optics/, (2021), 5 pages.
International Search Report and Written Opinion, dated May 23, 2023, for International Application No. PCT/US2023/012537, 10 pages.

* cited by examiner

COMPACT PERCEPTION DEVICE

CROSS-REFERENCE TO RELATED APPLICATIONS

This application claims priority to U.S. Provisional Patent Application Ser. No. 63/323,962, filed Mar. 25, 2022, entitled "Compact Perception Module," the content of which is hereby incorporated by reference in its entirety for all purposes.

FIELD OF THE TECHNOLOGY

This disclosure relates generally to optical sensing and, more particularly, to a compact perception device configured to receive both visible light and infrared light, and generate combined image data and depth data.

BACKGROUND

Light detection and ranging (LiDAR) systems use light pulses to create an image or point cloud of the external environment. Some typical LiDAR systems include a light source, a light transmitter, a light steering system, and a light detector. The light source generates a light beam that is directed by the light steering system in particular directions when being transmitted from the LiDAR system. When a transmitted light beam is scattered by an object, a portion of the scattered light returns to the LiDAR system as a return light pulse. The light detector detects the return light pulse. Using the difference between the time that the return light pulse is detected and the time that a corresponding light pulse in the light beam is transmitted, the LiDAR system can determine the distance to the object using the speed of light. The light steering system can direct light beams along different paths to allow the LiDAR system to scan the surrounding environment and produce images or point clouds. LiDAR systems can also use techniques other than time-of-flight and scanning to measure the surrounding environment. Cameras are sensors also frequently used for capturing images representing the external environment. Oftentimes, a LiDAR system operates in the infrared wavelength ranges and a camera operates in the visible light wavelength range.

SUMMARY

Embodiments provided in this disclosure use a compact perception device to generate combined image data and depth data. In the compact perception device, a LiDAR device and a camera can share certain optical components (e.g., a collection lens), thereby making the entire perception device much more compact than traditional designs. Furthermore, because the collection lens is shared for both the visible light and the infrared light, the field of view (FOV) for the image sensor and the depth sensor is naturally matched. As such, no or minimum calibration for distortion is required. In turn, this also eliminates or reduces the downstream data fusion workload, thereby improving energy efficiency and computational efficiency of the entire system.

In one embodiment, a compact perception device is provided. The compact perception device includes a compact perception device. The device includes a lens configured to collect both visible light and near infrared (NIR) light to obtain collected light including collected visible light and collected NIR light. The device further includes a first optical reflector optically coupled to the lens. The first optical reflector is configured to reflect one of the collected visible light or the collected NIR light, and pass the collected light that is not reflected by the first optical reflector. The device further includes an image sensor configured to detect the collected visible light directed by the first optical reflector to form image data. The device further includes a depth sensor configured to detect the collected NIR light directed by the first optical reflector to form depth data.

In one embodiment, a method performed by a compact perception device for perceiving an external environment is provided. The method comprises collecting, by a lens, both visible light and near infrared (NIR) light to obtain collected light including collected visible light and collected NIR light. The method further includes reflecting, by a first optical reflector, one of the collected visible light or the collected NIR light, and passing the collected light that is not reflected by the first optical reflector. The method further includes detecting, by an image sensor, the collected visible light directed by the first optical reflector to form image data; and detecting, by a depth sensor, the collected NIR light directed by the first optical reflector to form depth data.

BRIEF DESCRIPTION OF THE DRAWINGS

The present application can be best understood by reference to the figures described below taken in conjunction with the accompanying drawing figures, in which like parts may be referred to by like numerals.

DETAILED DESCRIPTION

Figure 1:
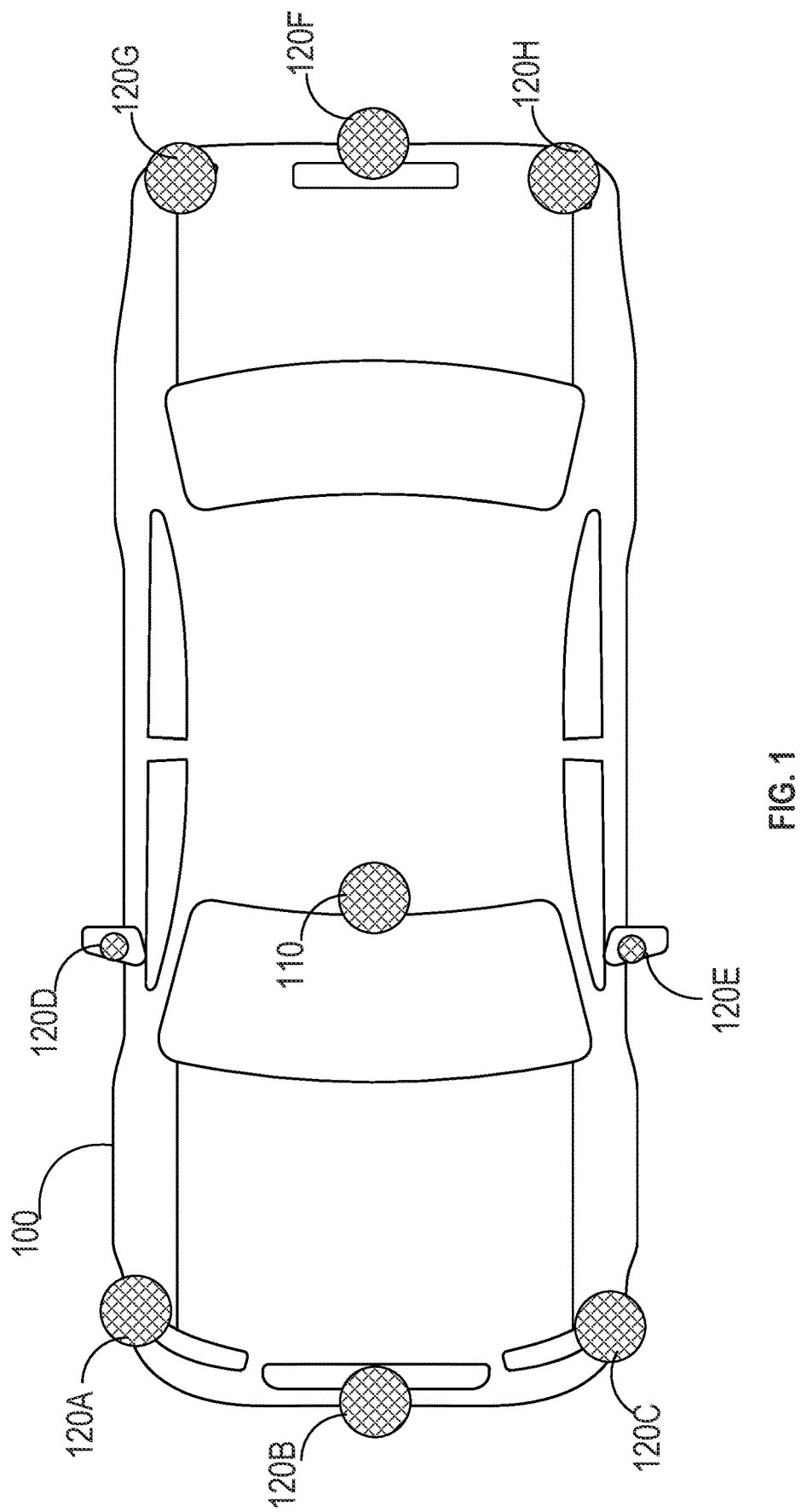
FIG. 1 illustrates one or more exemplary LiDAR systems disposed or included in a motor vehicle.

To provide a more thorough understanding of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

Although the following description uses terms "first," "second," etc. to describe various elements, these elements should not be limited by the terms. These terms are only used to distinguish one element from another. For example, a first mirror could be termed a second mirror and, similarly, a second mirror could be termed a first mirror, without departing from the scope of the various described examples. The first mirror and the second mirror can both be mirrors and, in some cases, can be separate and different mirrors.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the following disclosure, numerous references may be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, PLD, DSP, x86, ARM, RISC-V, Cold-Fire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of networks.

LiDAR devices and cameras are two types of commonly used sensors in assisted driving and autonomous driving technologies. Cameras can capture a scene with brightness and color, while LiDAR devices can capture a scene the depth information so that the distance to an object can be calculated. Cameras are now widely used in advanced driver-assistance systems (ADAS). Both LiDAR devices and cameras may be used in modern vehicles to assist drivers in visibility and spatial awareness. The data provided by the LiDAR devices and cameras can be used to, for example, provide parking assistance, assist in performing lane changes, provide the driver with information about detecting potential obstacles and hazards in blind spots around a moving vehicle, improve the driver's visibility around the rear end of the vehicle when backing up the vehicle, or the like.

Typically, a vehicle has separate LiDAR and camera devices, each with its own separate optical components such as lenses, windows, mirrors, or the like to direct and process optical signals. Each device may also have its own sensors, processors, and/or circuit boards. As a result, the combination of the LiDAR and camera devices may be bulky with many optical components and other components. As a result, the combination may be difficult to satisfy compact sensor design requirements especially for many passenger vehicles. In various embodiments of the compact perception device provided in the present disclosure, a LiDAR device and a camera can share certain optical components (e.g., a collection lens), thereby making the entire perception device much more compact than traditional designs. For example, a single lens can be used to collect both visible light and infrared light. The visible light can be directed to an image sensor for further sensing and processing; and the infrared light can be directed to a depth sensor for further sensing and processing. Furthermore, because the single lens collects both the visible light and the NIR light, the field of view (FOV) for the image sensor and the depth sensor is naturally matched (e.g., they are the same). As such, no or minimum calibration for distortion is required. In turn, this also eliminates or reduces the downstream data fusion workload, thereby improving energy efficiency and computational efficiency of the entire system. Embodiments of the present disclosure are described below in greater details.

FIG. 1 illustrates one or more exemplary LiDAR systems 110 disposed or included in a motor vehicle 100. Motor vehicle 100 can be a vehicle having any automated level. For example, motor vehicle 100 can be a partially automated vehicle, a highly automated vehicle, a fully automated vehicle, or a driverless vehicle. A partially automated vehicle can perform some driving functions without a human driver's intervention. For example, a partially automated vehicle can perform blind-spot monitoring, lane keeping and/or lane changing operations, automated emergency braking, smart cruising and/or traffic following, or the like. Certain operations of a partially automated vehicle may be limited to specific applications or driving scenarios (e.g., limited to only freeway driving). A highly automated vehicle can generally perform all operations of a partially automated vehicle but with less limitations. A highly automated vehicle can also detect its own limits in operating the vehicle and ask the driver to take over the control of the vehicle when necessary. A fully automated vehicle can perform all vehicle operations without a driver's intervention but can also detect its own limits and ask the driver to take over when necessary. A driverless vehicle can operate on its own without any driver intervention.

In typical configurations, motor vehicle 100 comprises one or more LiDAR systems 110 and 120A-F. Each of LiDAR systems 110 and 120A-F can be a scanning-based LiDAR system and/or a non-scanning LiDAR system (e.g., a flash LiDAR). A scanning-based LiDAR system scans one or more light beams in one or more directions (e.g., horizontal and vertical directions) to detect objects in a field-of-view (FOV). A non-scanning based LiDAR system transmits laser light to illuminate an FOV without scanning. For example, a flash LiDAR is a type of non-scanning based LiDAR system. A flash LiDAR can transmit laser light to simultaneously illuminate an FOV using a single light pulse or light shot.

A LiDAR system is often an essential sensor of a vehicle that is at least partially automated. In one embodiment, as shown in FIG. 1, motor vehicle 100 may include a single LiDAR system 110 (e.g., without LiDAR systems 120A-F) disposed at the highest position of the vehicle (e.g., at the vehicle roof). Disposing LiDAR system 110 at the vehicle roof facilitates a 360-degree scanning around vehicle 100. In some other embodiments, motor vehicle 100 can include multiple LiDAR systems, including two or more of systems 110 and/or 120A-F. As shown in FIG. 1, in one embodiment, multiple LiDAR systems 110 and/or 120A-F are attached to vehicle 100 at different locations of the vehicle. For example, LiDAR system 120A is attached to vehicle 100 at the front right corner; LiDAR system 120B is attached to vehicle 100 at the front center; LiDAR system 120C is attached to vehicle 100 at the front left corner; LiDAR system 120D is attached to vehicle 100 at the right-side rear view mirror; LiDAR system 120E is attached to vehicle 100 at the left-side rear view mirror; and/or LiDAR system 120F is attached to vehicle 100 at the back center. In some embodiments, LiDAR systems 110 and 120A-F are independent LiDAR systems having their own respective laser sources, control electronics, transmitters, receivers, and/or steering mechanisms. In other embodiments, some of LiDAR systems 110 and 120A-F can share one or more components, thereby forming a distributed sensor system. In one example, optical fibers are used to deliver laser light from a centralized laser source to all LiDAR systems. It is understood that one or more LiDAR systems can be distributed and attached to a vehicle in any desired manner and FIG. 1 only illustrates one embodiment. As another example, LiDAR systems 120D and 120E may be attached to the B-pillars of vehicle 100 instead of the rear-view mirrors. As another example, LiDAR system 120B may be attached to the windshield of vehicle 100 instead of the front bumper.

Figure 2:
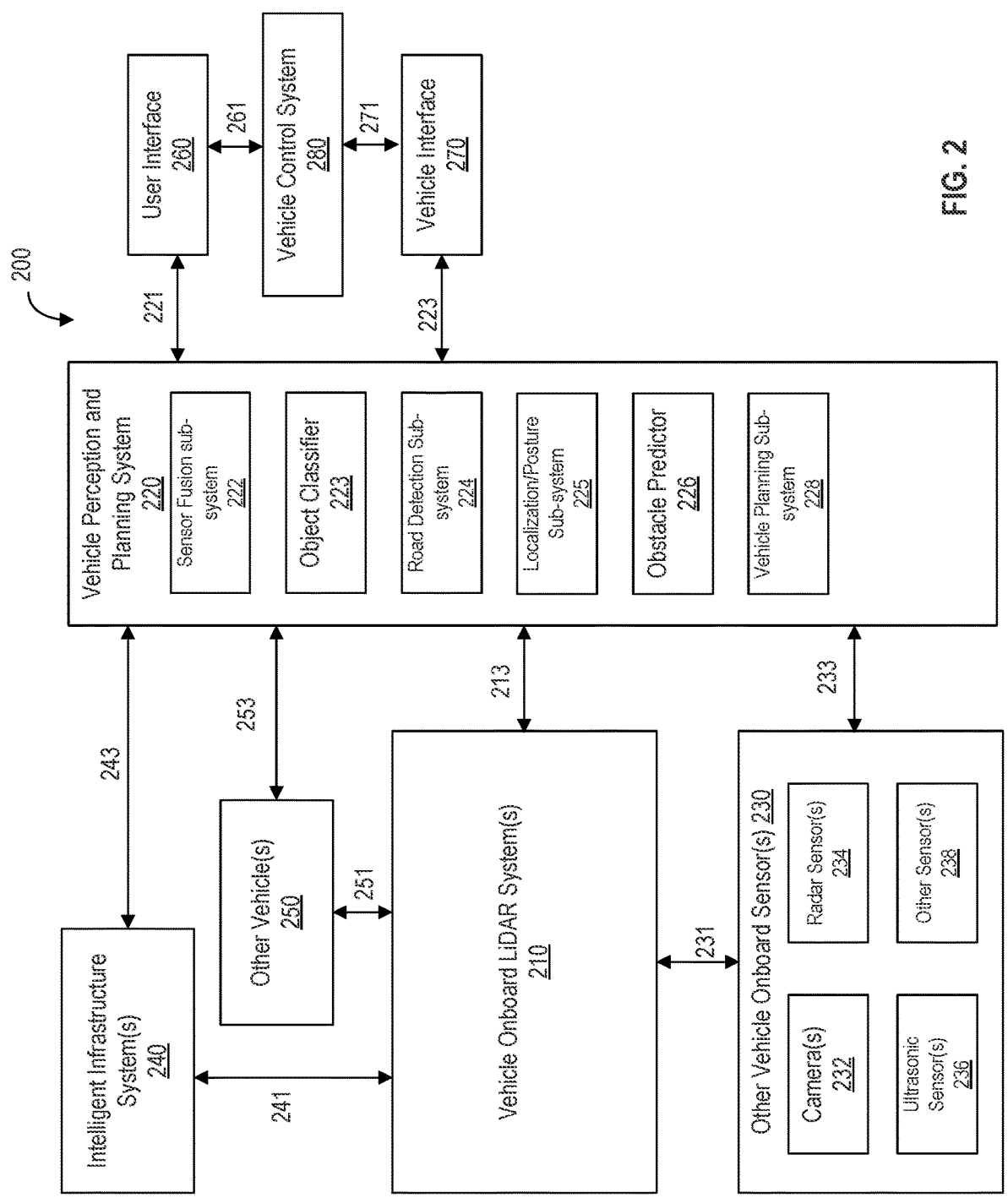
FIG. 2 is a block diagram illustrating interactions between an exemplary LiDAR system and multiple other systems including a vehicle perception and planning system.

FIG. 2 is a block diagram 200 illustrating interactions between vehicle onboard LiDAR system(s) 210 and multiple other systems including a vehicle perception and planning system 220. LiDAR system(s) 210 can be mounted on or integrated to a vehicle. LiDAR system(s) 210 include sensor(s) that scan laser light to the surrounding environment to measure the distance, angle, and/or velocity of objects. Based on the scattered light that returned to LiDAR system(s) 210, it can generate sensor data (e.g., image data or 3D point cloud data) representing the perceived external environment.

LiDAR system(s) 210 can include one or more of short-range LiDAR sensors, medium-range LiDAR sensors, and long-range LiDAR sensors. A short-range LiDAR sensor measures objects located up to about 20-40 meters from the LiDAR sensor. Short-range LiDAR sensors can be used for, e.g., monitoring nearby moving objects (e.g., pedestrians crossing street in a school zone), parking assistance applications, or the like. A medium-range LiDAR sensor measures objects located up to about 100-150 meters from the LiDAR sensor. Medium-range LiDAR sensors can be used for, e.g., monitoring road intersections, assistance for merging onto or leaving a freeway, or the like. A long-range LiDAR sensor measures objects located up to about 150-300 meters. Long-range LiDAR sensors are typically used when a vehicle is travelling at high speed (e.g., on a freeway), such that the vehicle's control systems may only have a few seconds (e.g., 6-8 seconds) to respond to any situations detected by the LiDAR sensor. As shown in FIG. 2, in one embodiment, the LiDAR sensor data can be provided to vehicle perception and planning system 220 via a communication path 213 for further processing and controlling the vehicle operations. Communication path 213 can be any wired or wireless communication links that can transfer data.

With reference still to FIG. 2, in some embodiments, other vehicle onboard sensor(s) 230 are used to provide additional sensor data separately or together with LiDAR system(s) 210. Other vehicle onboard sensors 230 may include, for example, one or more camera(s) 232, one or more radar(s) 234, one or more ultrasonic sensor(s) 236, and/or other sensor(s) 238. Camera(s) 232 can take images and/or videos of the external environment of a vehicle. Camera(s) 232 can take, for example, high-definition (HD) videos having millions of pixels in each frame. A camera produces monochrome or color images and videos. Color information may be important in interpreting data for some situations (e.g., interpreting images of traffic lights). Color information may not be available from other sensors such as LiDAR or radar sensors. Camera(s) 232 can include one or more of narrow-focus cameras, wider-focus cameras, side-facing cameras, infrared cameras, fisheye cameras, or the like. The image and/or video data generated by camera(s) 232 can also be provided to vehicle perception and planning system 220 via communication path 233 for further processing and controlling the vehicle operations. Communication path 233 can be any wired or wireless communication links that can transfer data.

Other vehicle onboard sensos(s) 230 can also include radar sensor(s) 234. Radar sensor(s) 234 use radio waves to determine the range, angle, and velocity of objects. Radar sensor(s) 234 produce electromagnetic waves in the radio or microwave spectrum. The electromagnetic waves reflect off an object and some of the reflected waves return to the radar sensor, thereby providing information about the object's position and velocity. Radar sensor(s) 234 can include one or more of short-range radar(s), medium-range radar(s), and long-range radar(s). A short-range radar measures objects located at about 0.1-30 meters from the radar. A short-range radar is useful in detecting objects located nearby the vehicle, such as other vehicles, buildings, walls, pedestrians, bicyclists, etc. A short-range radar can be used to detect a blind spot, assist in lane changing, provide rear-end collision warning, assist in parking, provide emergency braking, or the like. A medium-range radar measures objects located at about 30-80 meters from the radar. A long-range radar measures objects located at about 80-200 meters. Medium- and/or long-range radars can be useful in, for example, traffic following, adaptive cruise control, and/or highway automatic braking. Sensor data generated by radar sensor(s) 234 can also be provided to vehicle perception and planning system 220 via communication path 233 for further processing and controlling the vehicle operations.

Other vehicle onboard sensor(s) 230 can also include ultrasonic sensor(s) 236. Ultrasonic sensor(s) 236 use acoustic waves or pulses to measure object located external to a vehicle. The acoustic waves generated by ultrasonic sensor(s) 236 are transmitted to the surrounding environment. At least some of the transmitted waves are reflected off an object and return to the ultrasonic sensor(s) 236. Based on the return signals, a distance of the object can be calculated. Ultrasonic sensor(s) 236 can be useful in, for example, check blind spot, identify parking spots, provide lane changing assistance into traffic, or the like. Sensor data generated by ultrasonic sensor(s) 236 can also be provided to vehicle perception and planning system 220 via communication path 233 for further processing and controlling the vehicle operations.

In some embodiments, one or more other sensor(s) 238 may be attached in a vehicle and may also generate sensor data. Other sensor(s) 238 may include, for example, global positioning systems (GPS), inertial measurement units (IMU), or the like. Sensor data generated by other sensor(s) 238 can also be provided to vehicle perception and planning system 220 via communication path 233 for further processing and controlling the vehicle operations. It is understood that communication path 233 may include one or more communication links to transfer data between the various sensor(s) 230 and vehicle perception and planning system 220.

In some embodiments, as shown in FIG. 2, sensor data from other vehicle onboard sensor(s) 230 can be provided to vehicle onboard LiDAR system(s) 210 via communication path 231. LiDAR system(s) 210 may process the sensor data from other vehicle onboard sensor(s) 230. For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220. It is understood that other configurations may also be implemented for transmitting and processing sensor data from the various sensors (e.g., data can be transmitted to a cloud service for processing and then the processing results can be transmitted back to the vehicle perception and planning system 220).

With reference still to FIG. 2, in some embodiments, sensors onboard other vehicle(s) 250 are used to provide additional sensor data separately or together with LiDAR system(s) 210. For example, two or more nearby vehicles may have their own respective LiDAR sensor(s), camera(s), radar sensor(s), ultrasonic sensor(s), etc. Nearby vehicles can communicate and share sensor data with one another. Communications between vehicles are also referred to as V2V (vehicle to vehicle) communications. For example, as shown in FIG. 2, sensor data generated by other vehicle(s) 250 can be communicated to vehicle perception and planning system 220 and/or vehicle onboard LiDAR system(s) 210, via communication path 253 and/or communication path 251, respectively. Communication paths 253 and 251 can be any wired or wireless communication links that can transfer data.

Sharing sensor data facilitates a better perception of the environment external to the vehicles. For instance, a first vehicle may not sense a pedestrian that is a behind a second vehicle but is approaching the first vehicle. The second vehicle may share the sensor data related to this pedestrian with the first vehicle such that the first vehicle can have additional reaction time to avoid collision with the pedestrian. In some embodiments, similar to data generated by sensor(s) 230, data generated by sensors onboard other vehicle(s) 250 may be correlated or fused with sensor data generated by LiDAR system(s) 210, thereby at least partially offloading the sensor fusion process performed by vehicle perception and planning system 220.

In some embodiments, intelligent infrastructure system(s) 240 are used to provide sensor data separately or together with LiDAR system(s) 210. Certain infrastructures may be configured to communicate with a vehicle to convey information and vice versa. Communications between a vehicle and infrastructures are generally referred to as V2I (vehicle to infrastructure) communications. For example, intelligent infrastructure system(s) 240 may include an intelligent traffic light that can convey its status to an approaching vehicle in a message such as "changing to yellow in 5 seconds." Intelligent infrastructure system(s) 240 may also include its own LiDAR system mounted near an intersection such that it can convey traffic monitoring information to a vehicle. For example, a left-turning vehicle at an intersection may not have sufficient sensing capabilities because some of its own sensors may be blocked by traffics in the opposite direction. In such a situation, sensors of intelligent infrastructure system(s) 240 can provide useful, and sometimes vital, data to the left-turning vehicle. Such data may include, for example, traffic conditions, information of objects in the direction the vehicle is turning to, traffic light status and predictions, or the like. These sensor data generated by intelligent infrastructure system(s) 240 can be provided to vehicle perception and planning system 220 and/or vehicle onboard LiDAR system(s) 210, via communication paths 243 and/or 241, respectively. Communication paths 243 and/or 241 can include any wired or wireless communication links that can transfer data. For example, sensor data from intelligent infrastructure system(s) 240 may be transmitted to LiDAR system(s) 210 and correlated or fused with sensor data generated by LiDAR system(s) 210, thereby at least partially offloading the sensor fusion process performed by vehicle perception and planning system 220. V2V and V2I communications described above are examples of vehicle-to-X (V2X) communications, where the "X" represents any other devices, systems, sensors, infrastructure, or the like that can share data with a vehicle.

With reference still to FIG. 2, via various communication paths, vehicle perception and planning system 220 receives sensor data from one or more of LiDAR system(s) 210, other vehicle onboard sensor(s) 230, other vehicle(s) 250, and/or intelligent infrastructure system(s) 240. In some embodiments, different types of sensor data are correlated and/or integrated by a sensor fusion sub-system 222. For example, sensor fusion sub-system 222 can generate a 360-degree model using multiple images or videos captured by multiple cameras disposed at different positions of the vehicle. Sensor fusion sub-system 222 obtains sensor data from different types of sensors and uses the combined data to perceive the environment more accurately. For example, a vehicle onboard camera 232 may not capture a clear image because it is facing the sun or a light source (e.g., another vehicle's headlight during nighttime) directly. A LiDAR system 210 may not be affected as much and therefore sensor fusion sub-system 222 can combine sensor data provided by both camera 232 and LiDAR system 210, and use the sensor data provided by LiDAR system 210 to compensate the unclear image captured by camera 232. As another example, in a rainy or foggy weather, a radar sensor 234 may work better than a camera 232 or a LiDAR system 210. Accordingly, sensor fusion sub-system 222 may use sensor data provided by the radar sensor 234 to compensate the sensor data provided by camera 232 or LiDAR system 210.

In other examples, sensor data generated by other vehicle onboard sensor(s) 230 may have a lower resolution (e.g., radar sensor data) and thus may need to be correlated and confirmed by LiDAR system(s) 210, which usually has a higher resolution. For example, a sewage cover (also referred to as a manhole cover) may be detected by radar sensor 234 as an object towards which a vehicle is approaching. Due to the low-resolution nature of radar sensor 234, vehicle perception and planning system 220 may not be able to determine whether the object is an obstacle that the vehicle needs to avoid. High-resolution sensor data generated by LiDAR system(s) 210 thus can be used to correlated and confirm that the object is a sewage cover and causes no harm to the vehicle.

Vehicle perception and planning system 220 further comprises an object classifier 223. Using raw sensor data and/or correlated/fused data provided by sensor fusion sub-system 222, object classifier 223 can detect and classify the objects and estimate the positions of the objects. In some embodiments, object classifier 233 can use machine-learning based techniques to detect and classify objects. Examples of the machine-learning based techniques include utilizing algorithms such as region-based convolutional neural networks (R-CNN), Fast R-CNN, Faster R-CNN, histogram of oriented gradients (HOG), region-based fully convolutional network (R-FCN), single shot detector (SSD), spatial pyramid pooling (SPP-net), and/or You Only Look Once (Yolo).

Vehicle perception and planning system 220 further comprises a road detection sub-system 224. Road detection sub-system 224 localizes the road and identifies objects and/or markings on the road. For example, based on raw or fused sensor data provided by radar sensor(s) 234, camera(s) 232, and/or LiDAR system(s) 210, road detection sub-system 224 can build a 3D model of the road based on machine-learning techniques (e.g., pattern recognition algorithms for identifying lanes). Using the 3D model of the road, road detection sub-system 224 can identify objects (e.g., obstacles or debris on the road) and/or markings on the road (e.g., lane lines, turning marks, crosswalk marks, or the like).

Vehicle perception and planning system 220 further comprises a localization and vehicle posture sub-system 225. Based on raw or fused sensor data, localization and vehicle posture sub-system 225 can determine position of the vehicle and the vehicle's posture. For example, using sensor data from LiDAR system(s) 210, camera(s) 232, and/or GPS data, localization and vehicle posture sub-system 225 can determine an accurate position of the vehicle on the road and the vehicle's six degrees of freedom (e.g., whether the vehicle is moving forward or backward, up or down, and left or right). In some embodiments, high-definition (HD) maps are used for vehicle localization. HD maps can provide highly detailed, three-dimensional, computerized maps that pinpoint a vehicle's location. For instance, using the HD maps, localization and vehicle posture sub-system 225 can determine precisely the vehicle's current position (e.g., which lane of the road the vehicle is currently in, how close it is to a curb or a sidewalk) and predict vehicle's future positions.

Vehicle perception and planning system 220 further comprises obstacle predictor 226. Objects identified by object classifier 223 can be stationary (e.g., a light pole, a road sign) or dynamic (e.g., a moving pedestrian, bicycle, another car). For moving objects, predicting their moving path or future positions can be important to avoid collision.

Obstacle predictor 226 can predict an obstacle trajectory and/or warn the driver or the vehicle planning sub-system 228 about a potential collision. For example, if there is a high likelihood that the obstacle's trajectory intersects with the vehicle's current moving path, obstacle predictor 226 can generate such a warning. Obstacle predictor 226 can use a variety of techniques for making such a prediction. Such techniques include, for example, constant velocity or acceleration models, constant turn rate and velocity/acceleration models, Kalman Filter and Extended Kalman Filter based models, recurrent neural network (RNN) based models, long short-term memory (LSTM) neural network based models, encoder-decoder RNN models, or the like.

With reference still to FIG. 2, in some embodiments, vehicle perception and planning system 220 further comprises vehicle planning sub-system 228. Vehicle planning sub-system 228 can include a route planner, a driving behaviors planner, and a motion planner. The route planner can plan the route of a vehicle based on the vehicle's current location data, target location data, traffic information, etc. The driving behavior planner adjusts the timing and planned movement based on how other objects might move, using the obstacle prediction results provided by obstacle predictor 226. The motion planner determines the specific operations the vehicle needs to follow. The planning results are then communicated to vehicle control system 280 via vehicle interface 270. The communication can be performed through communication paths 223 and 271, which include any wired or wireless communication links that can transfer data.

Vehicle control system 280 controls the vehicle's steering mechanism, throttle, brake, etc., to operate the vehicle according to the planned route and movement. Vehicle perception and planning system 220 may further comprise a user interface 260, which provides a user (e.g., a driver) access to vehicle control system 280 to, for example, override or take over control of the vehicle when necessary. User interface 260 can communicate with vehicle perception and planning system 220, for example, to obtain and display raw or fused sensor data, identified objects, vehicle's location/posture, etc. These displayed data can help a user to better operate the vehicle. User interface 260 can communicate with vehicle perception and planning system 220 and/or vehicle control system 280 via communication paths 221 and 261 respectively, which include any wired or wireless communication links that can transfer data. It is understood that the various systems, sensors, communication links, and interfaces in FIG. 2 can be configured in any desired manner and not limited to the configuration shown in FIG. 2.

Figure 3:
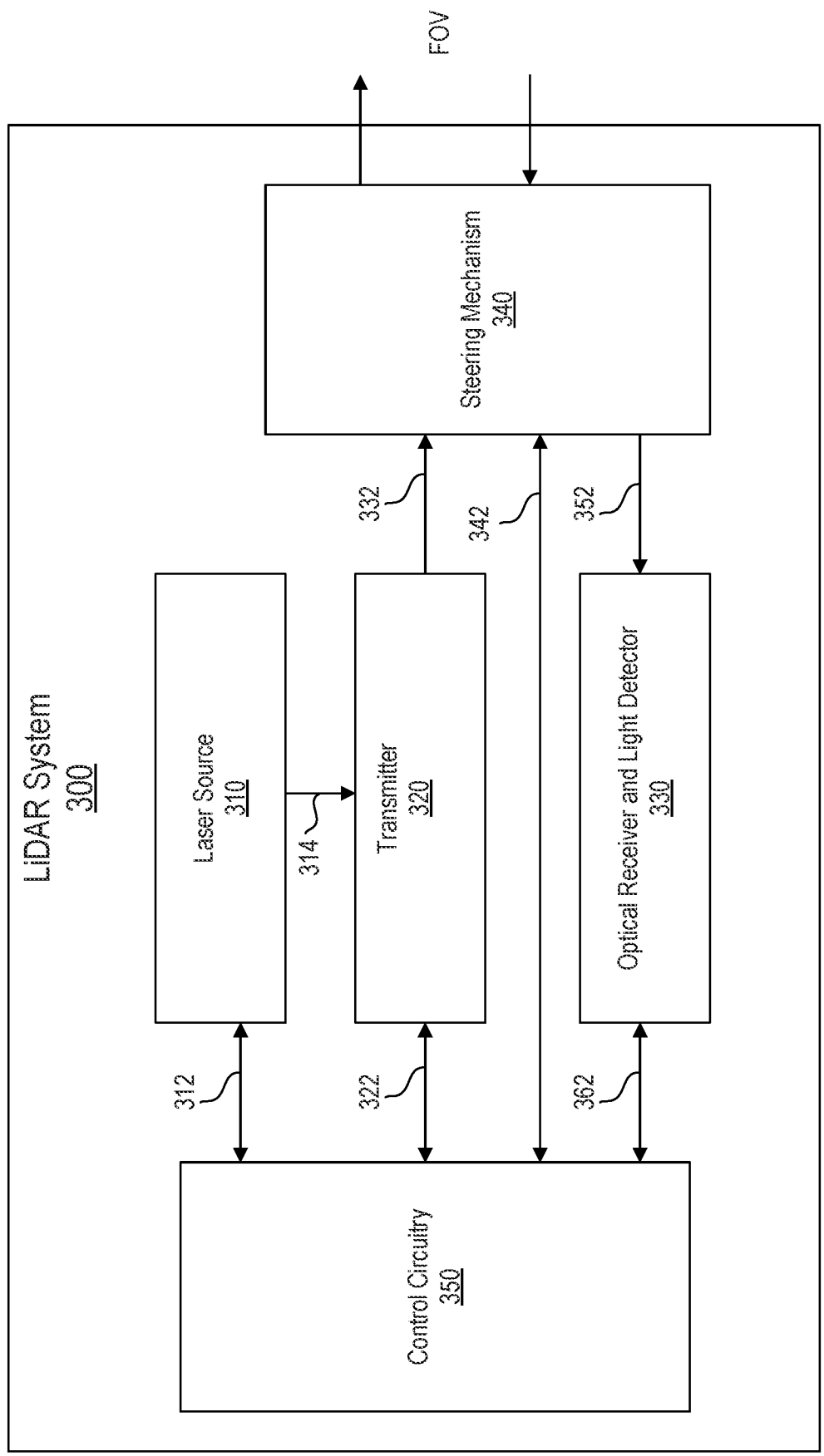
FIG. 3 is a block diagram illustrating an exemplary LiDAR system.

FIG. 3 is a block diagram illustrating an exemplary LiDAR system 300. LiDAR system 300 can be used to implement LiDAR system 110, 120A-F, and/or 210 shown in FIGS. 1 and 2. In one embodiment, LiDAR system 300 comprises a laser source 310, a transmitter 320, an optical receiver and light detector 330, a steering system 340, and a control circuitry 350. These components are coupled together using communications paths 312, 314, 322, 332, 343, 352, and 362. These communications paths include communication links (wired or wireless, bidirectional or unidirectional) among the various LiDAR system components, but need not be physical components themselves. While the communications paths can be implemented by one or more electrical wires, buses, or optical fibers, the communication paths can also be wireless channels or free-space optical paths so that no physical communication medium is present. For example, in one embodiment of LiDAR system 300, communication path 314 between laser source 310 and transmitter 320 may be implemented using one or more optical fibers. Communication paths 332 and 352 may represent optical paths implemented using free space optical components and/or optical fibers. And communication paths 312, 322, 342, and 362 may be implemented using one or more electrical wires that carry electrical signals. The communications paths can also include one or more of the above types of communication mediums (e.g., they can include an optical fiber and a free-space optical component, or include one or more optical fibers and one or more electrical wires).

LiDAR system 300 can also include other components not depicted in FIG. 3, such as power buses, power supplies, LED indicators, switches, etc. Additionally, other communication connections among components may be present, such as a direct connection between light source 310 and optical receiver and light detector 330 to provide a reference signal so that the time from when a light pulse is transmitted until a return light pulse is detected can be accurately measured.

Laser source 310 outputs laser light for illuminating objects in a field of view (FOV). Laser source 310 can be, for example, a semiconductor-based laser (e.g., a diode laser) and/or a fiber-based laser. A semiconductor-based laser can be, for example, an edge emitting laser (EEL), a vertical cavity surface emitting laser (VCSEL), or the like. A fiber-based laser is a laser in which the active gain medium is an optical fiber doped with rare-earth elements such as erbium, ytterbium, neodymium, dysprosium, praseodymium, thulium and/or holmium. In some embodiments, a fiber laser is based on double-clad fibers, in which the gain medium forms the core of the fiber surrounded by two layers of cladding. The double-clad fiber allows the core to be pumped with a high-power beam, thereby enabling the laser source to be a high power fiber laser source.

In some embodiments, laser source 310 comprises a master oscillator (also referred to as a seed laser) and power amplifier (MOPA). The power amplifier amplifies the output power of the seed laser. The power amplifier can be a fiber amplifier, a bulk amplifier, or a semiconductor optical amplifier. The seed laser can be a diode laser (e.g., a Fabry-Perot cavity laser, a distributed feedback laser), a solid-state bulk laser, or a tunable external-cavity diode laser. In some embodiments, laser source 310 can be an optically pumped microchip laser. Microchip lasers are alignment-free monolithic solid-state lasers where the laser crystal is directly contacted with the end mirrors of the laser resonator. A microchip laser is typically pumped with a laser diode (directly or using a fiber) to obtain the desired output power. A microchip laser can be based on neodymium-doped yttrium aluminum garnet ($Y_3Al_5O_{12}$) laser crystals (i.e., Nd:YAG), or neodymium-doped vanadate (i.e., ND:YVO$_4$) laser crystals.

Figure 4:
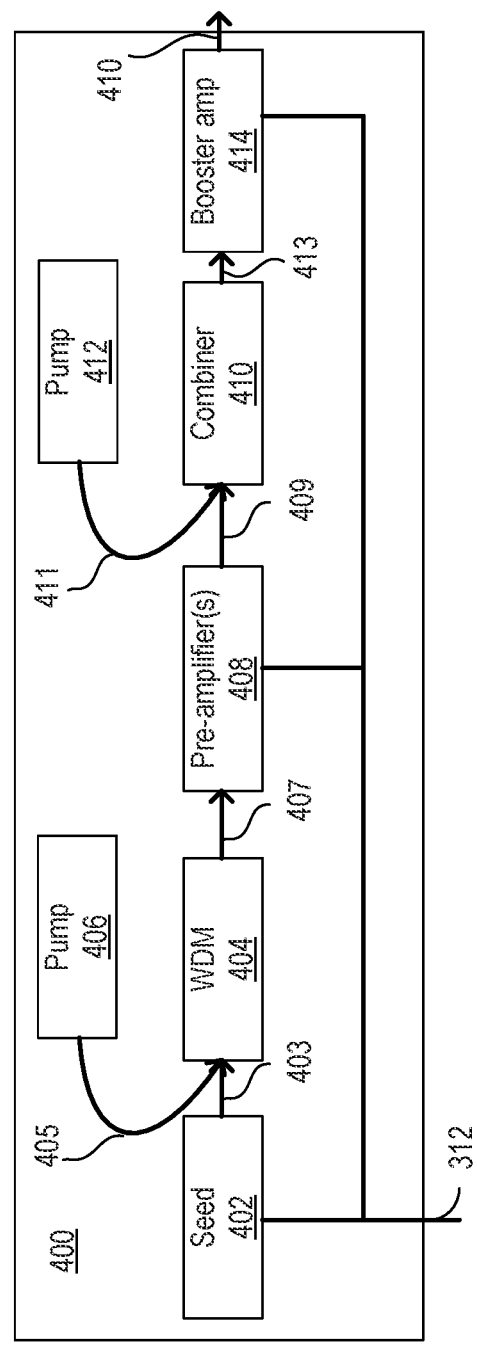
FIG. 4 is a block diagram illustrating an exemplary fiber-based laser source.

FIG. 4 is a block diagram illustrating an exemplary fiber-based laser source 400 having a seed laser and one or more pumps (e.g., laser diodes) for pumping desired output power. Fiber-based laser source 400 is an example of laser source 310 depicted in FIG. 3. In some embodiments, fiber-based laser source 400 comprises a seed laser 402 to generate initial light pulses of one or more wavelengths (e.g., 1550 nm), which are provided to a wavelength-division multiplexor (WDM) 404 via an optical fiber 403. Fiber-based laser source 400 further comprises a pump 406 for providing laser power (e.g., of a different wavelength, such as 980 nm) to WDM 404 via an optical fiber 405. WDM 404 multiplexes the light pulses provided by seed laser 402 and the laser power provided by pump 406 onto a single optical fiber 407. The output of WDM 404 can then be provided to one or more pre-amplifier(s) 408 via optical fiber 407. Pre-amplifier(s) 408 can be optical amplifier(s) that amplify optical signals (e.g., with about 20-30 dB gain). In some embodiments, pre-amplifier(s) 408 are low noise amplifiers. Pre-amplifier(s) 408 output to a combiner 410 via an optical fiber 409. Combiner 410 combines the output laser light of pre-amplifier(s) 408 with the laser power provided by pump 412 via an optical fiber 411. Combiner 410 can combine optical signals having the same wavelength or different wavelengths. One example of a combiner is a WDM. Combiner 410 provides pulses to a booster amplifier 414, which produces output light pulses via optical fiber 410. The booster amplifier 414 provides further amplification of the optical signals. The outputted light pulses can then be transmitted to transmitter 320 and/or steering mechanism 340 (shown in FIG. 3). It is understood that FIG. 4 illustrates one exemplary configuration of fiber-based laser source 400. Laser source 400 can have many other configurations using different combinations of one or more components shown in FIG. 4 and/or other components not shown in FIG. 4 (e.g., other components such as power supplies, lens, filters, splitters, combiners, etc.).

In some variations, fiber-based laser source 400 can be controlled (e.g., by control circuitry 350) to produce pulses of different amplitudes based on the fiber gain profile of the fiber used in fiber-based laser source 400. Communication path 312 couples fiber-based laser source 400 to control circuitry 350 (shown in FIG. 3) so that components of fiber-based laser source 400 can be controlled by or otherwise communicate with control circuitry 350. Alternatively, fiber-based laser source 400 may include its own dedicated controller. Instead of control circuitry 350 communicating directly with components of fiber-based laser source 400, a dedicated controller of fiber-based laser source 400 communicates with control circuitry 350 and controls and/or communicates with the components of fiber-based light source 400. Fiber-based light source 400 can also include other components not shown, such as one or more power connectors, power supplies, and/or power lines.

Referencing FIG. 3, typical operating wavelengths of laser source 310 comprise, for example, about 850 nm, about 905 nm, about 940 nm, about 1064 nm, and about 1550 nm. The upper limit of maximum usable laser power is set by the U.S. FDA (U.S. Food and Drug Administration) regulations. The optical power limit at 1550 nm wavelength is much higher than those of the other aforementioned wavelengths. Further, at 1550 nm, the optical power loss in a fiber is low. There characteristics of the 1550 nm wavelength make it more beneficial for long-range LiDAR applications. The amount of optical power output from laser source 310 can be characterized by its peak power, average power, and the pulse energy. The peak power is the ratio of pulse energy to the width of the pulse (e.g., full width at half maximum or FWHM). Thus, a smaller pulse width can provide a larger peak power for a fixed amount of pulse energy. A pulse width can be in the range of nanosecond or picosecond. The average power is the product of the energy of the pulse and the pulse repetition rate (PRR). As described in more detail below, the PRR represents the frequency of the pulsed laser light. The PRR typically corresponds to the maximum range that a LiDAR system can measure. Laser source 310 can be configured to produce pulses at high PRR to meet the desired number of data points in a point cloud generated by the LiDAR system. Laser source 310 can also be configured to produce pulses at medium or low PRR to meet the desired maximum detection distance. Wall plug efficiency (WPE) is another factor to evaluate the total power consumption, which may be a key indicator in evaluating the laser efficiency. For example, as shown in FIG. 1, multiple LiDAR systems may be attached to a vehicle, which may be an electrical-powered vehicle or a vehicle otherwise having limited fuel or battery power supply. Therefore, high WPE and intelligent ways to use laser power are often among the important considerations when selecting and configuring laser source 310 and/or designing laser delivery systems for vehicle-mounted LiDAR applications.

It is understood that the above descriptions provide non-limiting examples of a laser source 310. Laser source 310 can be configured to include many other types of light sources (e.g., laser diodes, short-cavity fiber lasers, solid-state lasers, and/or tunable external cavity diode lasers) that are configured to generate one or more light signals at various wavelengths. In some examples, light source 310 comprises amplifiers (e.g., pre-amplifiers and/or booster amplifiers), which can be a doped optical fiber amplifier, a solid-state bulk amplifier, and/or a semiconductor optical amplifier. The amplifiers are configured to receive and amplify light signals with desired gains.

With reference back to FIG. 3, LiDAR system 300 further comprises a transmitter 320. Laser source 310 provides laser light (e.g., in the form of a laser beam) to transmitter 320. The laser light provided by laser source 310 can be amplified laser light with a predetermined or controlled wavelength, pulse repetition rate, and/or power level. Transmitter 320 receives the laser light from laser source 310 and transmits the laser light to steering mechanism 340 with low divergence. In some embodiments, transmitter 320 can include, for example, optical components (e.g., lens, fibers, mirrors, etc.) for transmitting laser beams to a field-of-view (FOV) directly or via steering mechanism 340. While FIG. 3 illustrates transmitter 320 and steering mechanism 340 as separate components, they may be combined or integrated as one system in some embodiments. Steering mechanism 340 is described in more detail below.

Laser beams provided by laser source 310 may diverge as they travel to transmitter 320. Therefore, transmitter 320 often comprises a collimating lens configured to collect the diverging laser beams and produce more parallel optical beams with reduced or minimum divergence. The collimated optical beams can then be further directed through various optics such as mirrors and lens. A collimating lens may be, for example, a single plano-convex lens or a lens group. The collimating lens can be configured to achieve any desired properties such as the beam diameter, divergence, numerical aperture, focal length, or the like. A beam propagation ratio or beam quality factor (also referred to as the M2 factor) is used for measurement of laser beam quality. In many LiDAR applications, it is important to have good laser beam quality in the generated transmitting laser beam. The M2 factor represents a degree of variation of a beam from an ideal Gaussian beam. Thus, the M2 factor reflects how well a collimated laser beam can be focused on a small spot, or how well a divergent laser beam can be collimated. Therefore, laser source 310 and/or transmitter 320 can be configured to meet, for example, a scan resolution requirement while maintaining the desired M2 factor.

One or more of the light beams provided by transmitter 320 are scanned by steering mechanism 340 to a FOV. Steering mechanism 340 scans light beams in multiple dimensions (e.g., in both the horizontal and vertical dimension) to facilitate LiDAR system 300 to map the environment by generating a 3D point cloud. Steering mechanism 340 will be described in more detail below. The laser light scanned to an FOV may be scattered or reflected by an object in the FOV. At least a portion of the scattered or reflected light returns to LiDAR system 300. FIG. 3 further illustrates an optical receiver and light detector 330 configured to receive the return light. Optical receiver and light detector 330 comprises an optical receiver that is configured to collect the return light from the FOV. The optical receiver can include optics (e.g., lens, fibers, mirrors, etc.) for receiving, redirecting, focus, amplifying, and/or filtering return light from the FOV. For example, the optical receiver often includes a collection lens (e.g., a single plano-convex lens or a lens group) to collect and/or focus the collected return light onto a light detector.

A light detector detects the return light focused by the optical receiver and generates current and/or voltage signals proportional to the incident intensity of the return light. Based on such current and/or voltage signals, the depth information of the object in the FOV can be derived. One exemplary method for deriving such depth information is based on the direct TOF (time of flight), which is described in more detail below. A light detector may be characterized by its detection sensitivity, quantum efficiency, detector bandwidth, linearity, signal to noise ratio (SNR), overload resistance, interference immunity, etc. Based on the applications, the light detector can be configured or customized to have any desired characteristics. For example, optical receiver and light detector 330 can be configured such that the light detector has a large dynamic range while having a good linearity. The light detector linearity indicates the detector's capability of maintaining linear relationship between input optical signal power and the detector's output. A detector having good linearity can maintain a linear relationship over a large dynamic input optical signal range.

To achieve desired detector characteristics, configurations or customizations can be made to the light detector's structure and/or the detector's material system. Various detector structure can be used for a light detector. For example, a light detector structure can be a PIN based structure, which has a undoped intrinsic semiconductor region (i.e., an "i" region) between a p-type semiconductor and an n-type semiconductor region. Other light detector structures comprise, for example, a APD (avalanche photodiode) based structure, a PMT (photomultiplier tube) based structure, a SiPM (Silicon photomultiplier) based structure, a SPAD (single-photon avalanche diode) base structure, and/or quantum wires. For material systems used in a light detector, Si, InGaAs, and/or Si/Ge based materials can be used. It is understood that many other detector structures and/or material systems can be used in optical receiver and light detector 330.

A light detector (e.g., an APD based detector) may have an internal gain such that the input signal is amplified when generating an output signal. However, noise may also be amplified due to the light detector's internal gain. Common types of noise include signal shot noise, dark current shot noise, thermal noise, and amplifier noise (TIA). In some embodiments, optical receiver and light detector 330 may include a pre-amplifier that is a low noise amplifier (LNA). In some embodiments, the pre-amplifier may also include a TIA-transimpedance amplifier, which converts a current signal to a voltage signal. For a linear detector system, input equivalent noise or noise equivalent power (NEP) measures how sensitive the light detector is to weak signals. Therefore, they can be used as indicators of the overall system performance. For example, the NEP of a light detector specifies the power of the weakest signal that can be detected and therefore it in turn specifies the maximum range of a LiDAR system. It is understood that various light detector optimization techniques can be used to meet the requirement of LiDAR system 300. Such optimization techniques may include selecting different detector structures, materials, and/or implement signal processing techniques (e.g., filtering, noise reduction, amplification, or the like). For example, in addition to or instead of using direct detection of return signals (e.g., by using TOF), coherent detection can also be used for a light detector. Coherent detection allows for detecting amplitude and phase information of the received light by interfering the received light with a local oscillator. Coherent detection can improve detection sensitivity and noise immunity.

FIG. 3 further illustrates that LiDAR system 300 comprises steering mechanism 340. As described above, steering mechanism 340 directs light beams from transmitter 320 to scan an FOV in multiple dimensions. A steering mechanism is referred to as a raster mechanism or a scanning mechanism. Scanning light beams in multiple directions (e.g., in both the horizontal and vertical directions) facilitates a LiDAR system to map the environment by generating an image or a 3D point cloud. A steering mechanism can be based on mechanical scanning and/or solid-state scanning. Mechanical scanning uses rotating mirrors to steer the laser beam or physically rotate the LiDAR transmitter and receiver (collectively referred to as transceiver) to scan the laser beam. Solid-state scanning directs the laser beam to various positions through the FOV without mechanically moving any macroscopic components such as the transceiver. Solid-state scanning mechanisms include, for example, optical phased arrays based steering and flash LiDAR based steering. In some embodiments, because solid-state scanning mechanisms do not physically move macroscopic components, the steering performed by a solid-state scanning mechanism may be referred to as effective steering. A LiDAR system using solid-state scanning may also be referred to as a non-mechanical scanning or simply non-scanning LiDAR system (a flash LiDAR system is an exemplary non-scanning LiDAR system).

Steering mechanism 340 can be used with the transceiver (e.g., transmitter 320 and optical receiver and light detector 330) to scan the FOV for generating an image or a 3D point cloud. As an example, to implement steering mechanism 340, a two-dimensional mechanical scanner can be used with a single-point or several single-point transceivers. A single-point transceiver transmits a single light beam or a small number of light beams (e.g., 2-8 beams) to the steering mechanism. A two-dimensional mechanical steering mechanism comprises, for example, polygon mirror(s), oscillating mirror(s), rotating prism(s), rotating tilt mirror surface(s), or a combination thereof. In some embodiments, steering mechanism 340 may include non-mechanical steering mechanism(s) such as solid-state steering mechanism(s). For example, steering mechanism 340 can be based on tuning wavelength of the laser light combined with refraction effect, and/or based on reconfigurable grating/phase array. In some embodiments, steering mechanism 340 can use a single scanning device to achieve two-dimensional scanning or two devices combined to realize two-dimensional scanning.

As another example, to implement steering mechanism 340, a one-dimensional mechanical scanner can be used with an array or a large number of single-point transceivers. Specifically, the transceiver array can be mounted on a rotating platform to achieve 360-degree horizontal field of view. Alternatively, a static transceiver array can be combined with the one-dimensional mechanical scanner. A one-dimensional mechanical scanner comprises polygon mirror(s), oscillating mirror(s), rotating prism(s), rotating tilt mirror surface(s) for obtaining a forward-looking horizontal field of view. Steering mechanisms using mechanical scanners can provide robustness and reliability in high volume production for automotive applications.

As another example, to implement steering mechanism 340, a two-dimensional transceiver can be used to generate a scan image or a 3D point cloud directly. In some embodiments, a stitching or micro shift method can be used to improve the resolution of the scan image or the field of view being scanned. For example, using a two-dimensional transceiver, signals generated at one direction (e.g., the horizontal direction) and signals generated at the other direction (e.g., the vertical direction) may be integrated, interleaved, and/or matched to generate a higher or full resolution image or 3D point cloud representing the scanned FOV.

Some implementations of steering mechanism 340 comprise one or more optical redirection elements (e.g., mirrors or lens) that steer return light signals (e.g., by rotating, vibrating, or directing) along a receive path to direct the return light signals to optical receiver and light detector 330. The optical redirection elements that direct light signals along the transmitting and receiving paths may be the same components (e.g., shared), separate components (e.g., dedicated), and/or a combination of shared and separate components. This means that in some cases the transmitting and receiving paths are different although they may partially overlap (or in some cases, substantially overlap).

With reference still to FIG. 3, LiDAR system 300 further comprises control circuitry 350. Control circuitry 350 can be configured and/or programmed to control various parts of the LiDAR system 300 and/or to perform signal processing. In a typical system, control circuitry 350 can be configured and/or programmed to perform one or more control operations including, for example, controlling laser source 310 to obtain desired laser pulse timing, repetition rate, and power; controlling steering mechanism 340 (e.g., controlling the speed, direction, and/or other parameters) to scan the FOV and maintain pixel registration/alignment; controlling optical receiver and light detector 330 (e.g., controlling the sensitivity, noise reduction, filtering, and/or other parameters) such that it is an optimal state; and monitoring overall system health/status for functional safety.

Control circuitry 350 can also be configured and/or programmed to perform signal processing to the raw data generated by optical receiver and light detector 330 to derive distance and reflectance information, and perform data packaging and communication to vehicle perception and planning system 220 (shown in FIG. 2). For example, control circuitry 350 determines the time it takes from transmitting a light pulse until a corresponding return light pulse is received; determines when a return light pulse is not received for a transmitted light pulse; determines the direction (e.g., horizontal and/or vertical information) for a transmitted/return light pulse; determines the estimated range in a particular direction; and/or determines any other type of data relevant to LiDAR system 300.

LiDAR system 300 can be disposed in a vehicle, which may operate in many different environments including hot or cold weather, rough road conditions that may cause intense vibration, high or low humidies, dusty areas, etc. Therefore, in some embodiments, optical and/or electronic components of LiDAR system 300 (e.g., optics in transmitter 320, optical receiver and light detector 330, and steering mechanism 340) are disposed or configured in such a manner to maintain long term mechanical and optical stability. For example, components in LiDAR system 300 may be secured and sealed such that they can operate under all conditions a vehicle may encounter. As an example, an anti-moisture coating and/or hermetic sealing may be applied to optical components of transmitter 320, optical receiver and light detector 330, and steering mechanism 340 (and other components that are susceptible to moisture). As another example, housing(s), enclosure(s), and/or window can be used in LiDAR system 300 for providing desired characteristics such as hardness, ingress protection (IP) rating, self-cleaning capability, resistance to chemical and resistance to impact, or the like. In addition, efficient and economical methodologies for assembling LiDAR system 300 may be used to meet the LiDAR operating requirements while keeping the cost low.

It is understood by a person of ordinary skill in the art that FIG. 3 and the above descriptions are for illustrative purposes only, and a LiDAR system can include other functional units, blocks, or segments, and can include variations or combinations of these above functional units, blocks, or segments. For example, LiDAR system 300 can also include other components not depicted in FIG. 3, such as power buses, power supplies, LED indicators, switches, etc. Additionally, other connections among components may be present, such as a direct connection between light source 310 and optical receiver and light detector 330 so that light detector 330 can accurately measure the time from when light source 310 transmits a light pulse until light detector 330 detects a return light pulse.

These components shown in FIG. 3 are coupled together using communications paths 312, 314, 322, 332, 342, 352, and 362. These communications paths represent communication (bidirectional or unidirectional) among the various LiDAR system components but need not be physical components themselves. While the communications paths can be implemented by one or more electrical wires, busses, or optical fibers, the communication paths can also be wireless channels or open-air optical paths so that no physical communication medium is present. For example, in one exemplary LiDAR system, communication path 314 includes one or more optical fibers; communication path 352 represents an optical path; and communication paths 312, 322, 342, and 362 are all electrical wires that carry electrical signals. The communication paths can also include more than one of the above types of communication mediums (e.g., they can include an optical fiber and an optical path, or one or more optical fibers and one or more electrical wires).

Figure 5A:
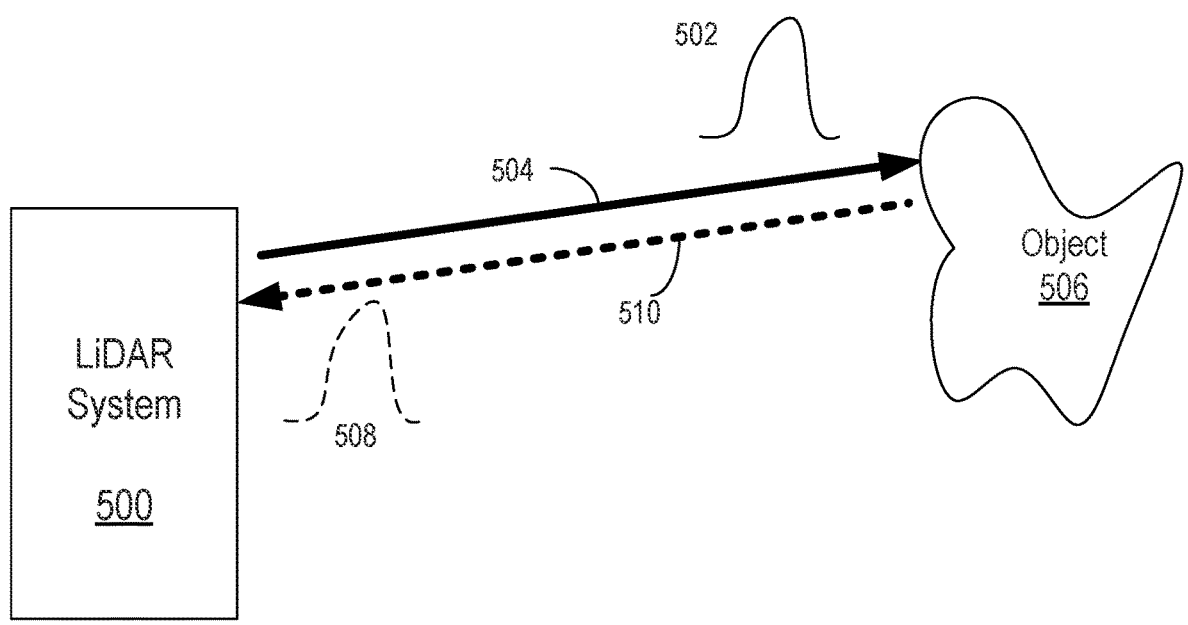
FIGS. 5A-5C illustrates an exemplary LiDAR system using pulse signals to measure distances to objects disposed in a field-of-view (FOV).

As described above, some LiDAR systems use the time-of-flight (TOF) of light signals (e.g., light pulses) to determine the distance to objects in a light path. For example, with reference to FIG. 5A, an exemplary LiDAR system 500 includes a laser light source (e.g., a fiber laser), a steering system (e.g., a system of one or more moving mirrors), and a light detector (e.g., a photon detector with one or more optics). LiDAR system 500 can be implemented using, for example, LiDAR system 300 described above. LiDAR system 500 transmits a light pulse 502 along light path 504 as determined by the steering system of LiDAR system 500. In the depicted example, light pulse 502, which is generated by the laser light source, is a short pulse of laser light. Further, the signal steering system of the LiDAR system 500 is a pulsed-signal steering system. However, it should be appreciated that LiDAR systems can operate by generating, transmitting, and detecting light signals that are not pulsed and derive ranges to an object in the surrounding environment using techniques other than time-of-flight. For example, some LiDAR systems use frequency modulated continuous waves (i.e., "FMCW"). It should be further appreciated that any of the techniques described herein with respect to time-of-flight based systems that use pulsed signals also may be applicable to LiDAR systems that do not use one or both of these techniques.

Referring back to FIG. 5A (e.g., illustrating a time-of-flight LiDAR system that uses light pulses), when light pulse 502 reaches object 506, light pulse 502 scatters or reflects to generate a return light pulse 508. Return light pulse 508 may return to system 500 along light path 510. The time from when transmitted light pulse 502 leaves LiDAR system 500 to when return light pulse 508 arrives back at LiDAR system 500 can be measured (e.g., by a processor or other electronics, such as control circuitry 350, within the LiDAR system). This time-of-flight combined with the knowledge of the speed of light can be used to determine the range/distance from LiDAR system 500 to the portion of object 506 where light pulse 502 scattered or reflected.

Figure 5B:
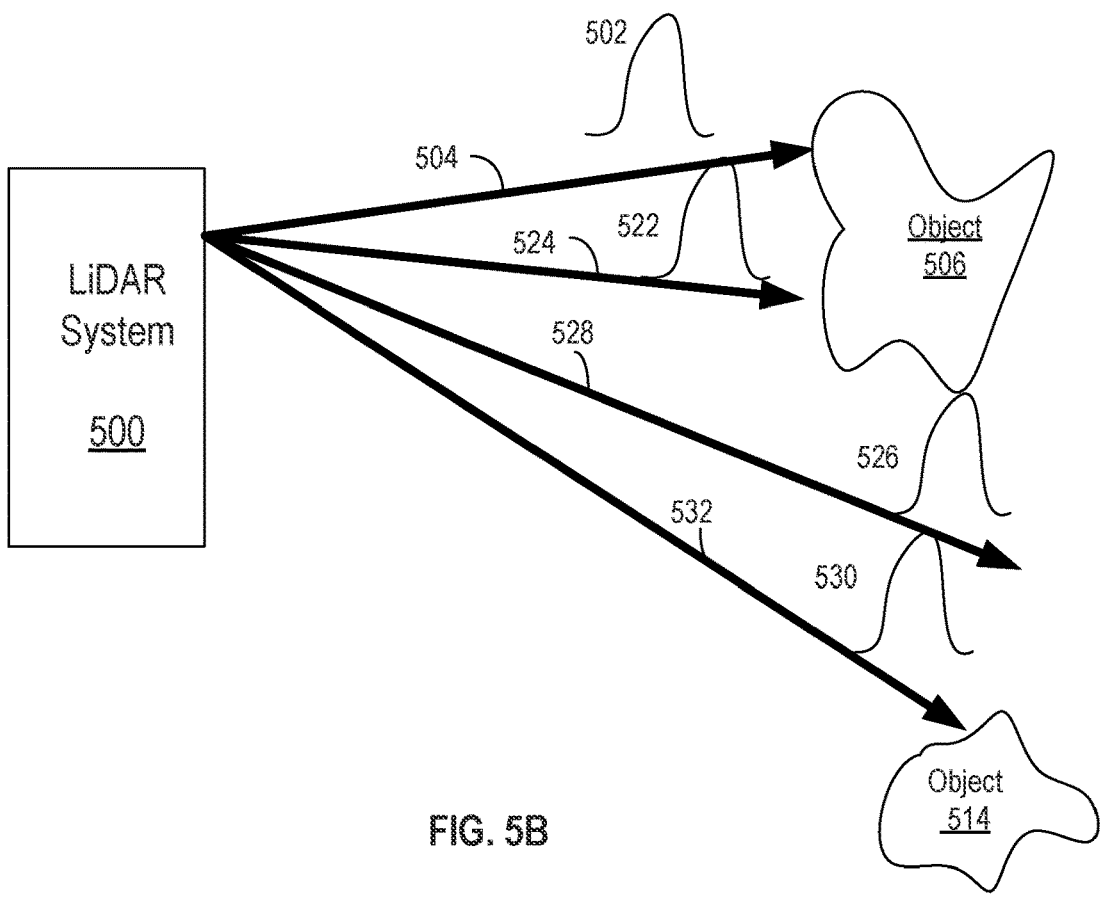
Figure 5C:
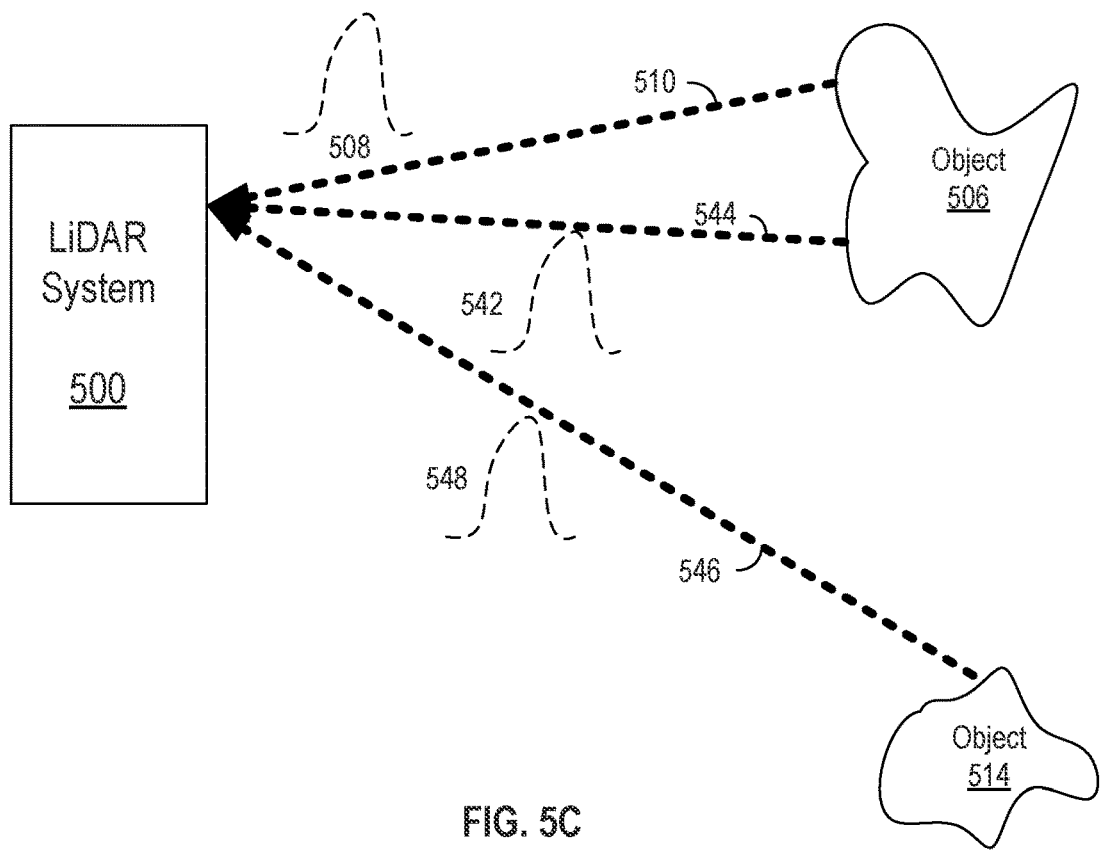

By directing many light pulses, as depicted in FIG. 5B, LiDAR system 500 scans the external environment (e.g., by directing light pulses 502, 522, 526, 530 along light paths 504, 524, 528, 532, respectively). As depicted in FIG. 5C, LiDAR system 500 receives return light pulses 508, 542, 548 (which correspond to transmitted light pulses 502, 522, 530, respectively). Return light pulses 508, 542, and 548 are generated by scattering or reflecting the transmitted light pulses by one of objects 506 and 514. Return light pulses 508, 542, and 548 may return to LiDAR system 500 along light paths 510, 544, and 546, respectively. Based on the direction of the transmitted light pulses (as determined by LiDAR system 500) as well as the calculated range from LiDAR system 500 to the portion of objects that scatter or reflect the light pulses (e.g., the portions of objects 506 and 514), the external environment within the detectable range (e.g., the field of view between path 504 and 532, inclusively) can be precisely mapped or plotted (e.g., by generating a 3D point cloud or images).

If a corresponding light pulse is not received for a particular transmitted light pulse, then it may be determined that there are no objects within a detectable range of LiDAR system 500 (e.g., an object is beyond the maximum scanning distance of LiDAR system 500). For example, in FIG. 5B, light pulse 526 may not have a corresponding return light pulse (as illustrated in FIG. 5C) because light pulse 526 may not produce a scattering event along its transmission path 528 within the predetermined detection range. LiDAR system 500, or an external system in communication with LiDAR system 500 (e.g., a cloud system or service), can interpret the lack of return light pulse as no object being disposed along light path 528 within the detectable range of LiDAR system 500.

In FIG. 5B, light pulses 502, 522, 526, and 530 can be transmitted in any order, serially, in parallel, or based on other timings with respect to each other. Additionally, while FIG. 5B depicts transmitted light pulses as being directed in one dimension or one plane (e.g., the plane of the paper), LiDAR system 500 can also direct transmitted light pulses along other dimension(s) or plane(s). For example, LiDAR system 500 can also direct transmitted light pulses in a dimension or plane that is perpendicular to the dimension or plane shown in FIG. 5B, thereby forming a 2-dimensional transmission of the light pulses. This 2-dimensional transmission of the light pulses can be point-by-point, line-by-line, all at once, or in some other manner. A point cloud or image from a 1-dimensional transmission of light pulses (e.g., a single horizontal line) can generate 2-dimensional data (e.g., (1) data from the horizontal transmission direction and (2) the range or distance to objects). Similarly, a point cloud or image from a 2-dimensional transmission of light pulses can generate 3-dimensional data (e.g., (1) data from the horizontal transmission direction, (2) data from the vertical transmission direction, and (3) the range or distance to objects). In general, a LiDAR system performing an n-dimensional transmission of light pulses generates (n+1) dimensional data. This is because the LiDAR system can measure the depth of an object or the range/distance to the object, which provides the extra dimension of data. Therefore, a 2D scanning by a LiDAR system can generate a 3D point cloud for mapping the external environment of the LiDAR system.

The density of a point cloud refers to the number of measurements (data points) per area performed by the LiDAR system. A point cloud density relates to the LiDAR scanning resolution. Typically, a larger point cloud density, and therefore a higher resolution, is desired at least for the region of interest (ROI). The density of points in a point cloud or image generated by a LiDAR system is equal to the number of pulses divided by the field of view. In some embodiments, the field of view can be fixed. Therefore, to increase the density of points generated by one set of transmission-receiving optics (or transceiver optics), the LiDAR system may need to generate a pulse more frequently. In other words, a light source with a higher pulse repetition rate (PRR) is needed. On the other hand, by generating and transmitting pulses more frequently, the farthest distance that the LiDAR system can detect may be limited. For example, if a return signal from a distant object is received after the system transmits the next pulse, the return signals may be detected in a different order than the order in which the corresponding signals are transmitted, thereby causing ambiguity if the system cannot correctly correlate the return signals with the transmitted signals.

To illustrate, consider an exemplary LiDAR system that can transmit laser pulses with a repetition rate between 500 kHz and 1 MHz. Based on the time it takes for a pulse to return to the LiDAR system and to avoid mix-up of return pulses from consecutive pulses in a conventional LiDAR design, the farthest distance the LiDAR system can detect may be 300 meters and 150 meters for 500 kHz and 1 MHz, respectively. The density of points of a LiDAR system with 500 kHz repetition rate is half of that with 1 MHz. Thus, this example demonstrates that, if the system cannot correctly correlate return signals that arrive out of order, increasing the repetition rate from 500 kHz to 1 MHz (and thus improving the density of points of the system) may reduce the detection range of the system. Various techniques are used to mitigate the tradeoff between higher PRR and limited detection range. For example, multiple wavelengths can be used for detecting objects in different ranges. Optical and/or signal processing techniques are also used to correlate between transmitted and return light signals.

Various systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Various systems, apparatus, and methods described herein may be implemented using computers operating in a client-server relationship. Typically, in such a system, the client computers are located remotely from the server computers and interact via a network. The client-server relationship may be defined and controlled by computer programs running on the respective client and server computers. Examples of client computers can include desktop computers, workstations, portable computers, cellular smartphones, tablets, or other types of computing devices.

Various systems, apparatus, and methods described herein may be implemented using a computer program product tangibly embodied in an information carrier, e.g., in a non-transitory machine-readable storage device, for execution by a programmable processor; and the method processes and steps described herein, including one or more of the steps of embodiments 24-43 set forth below, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
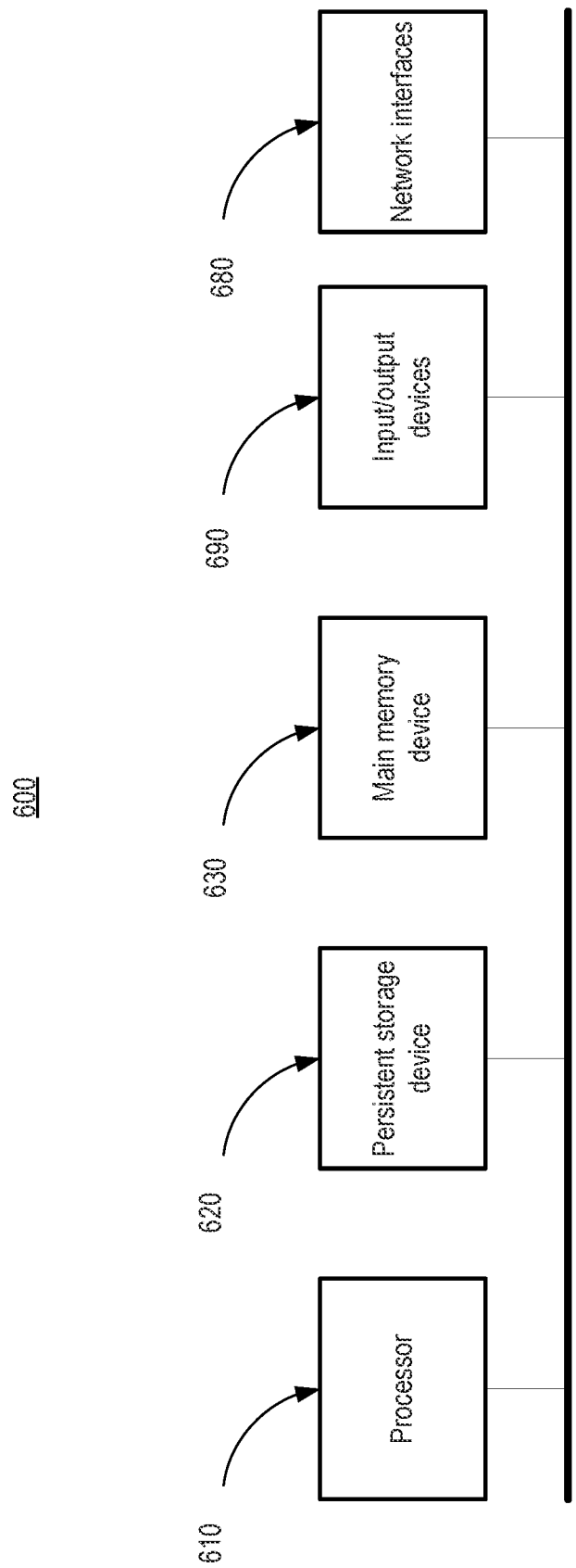
FIG. 6 is a block diagram illustrating an exemplary apparatus used to implement systems, apparatus, and methods in various embodiments.

A high-level block diagram of an exemplary apparatus that may be used to implement systems, apparatus and methods described herein is illustrated in FIG. 6. Apparatus 600 comprises a processor 610 operatively coupled to a persistent storage device 620 and a main memory device 630. Processor 610 controls the overall operation of apparatus 600 by executing computer program instructions that define such operations. The computer program instructions may be stored in persistent storage device 620, or other computer-readable medium, and loaded into main memory device 630 when execution of the computer program instructions is desired. For example, processor 610 may be used to implement one or more components and systems described herein, such as control circuitry 350 (shown in FIG. 3), vehicle perception and planning system 220 (shown in FIG. 2), and vehicle control system 280 (shown in FIG. 2). Thus, the method steps of embodiments 24-43 set forth below can be defined by the computer program instructions stored in main memory device 630 and/or persistent storage device 620 and controlled by processor 610 executing the computer program instructions. For example, the computer program instructions can be implemented as computer executable code programmed by one skilled in the art to perform an algorithm defined by the method steps of embodiments 24-43 shown below. Accordingly, by executing the computer program instructions, the processor 610 executes an algorithm defined by the methods of embodiments 24-43 set forth below. Apparatus 600 also includes one or more network interfaces 680 for communicating with other devices via a network. Apparatus 600 may also include one or more input/output devices 690 that enable user interaction with apparatus 600 (e.g., display, keyboard, mouse, speakers, buttons, etc.).

Processor 610 may include both general and special purpose microprocessors and may be the sole processor or one of multiple processors of apparatus 600. Processor 610 may comprise one or more central processing units (CPUs), and one or more graphics processing units (GPUs), which, for example, may work separately from and/or multi-task with one or more CPUs to accelerate processing, e.g., for various image processing applications described herein. Processor 610, persistent storage device 620, and/or main memory device 630 may include, be supplemented by, or incorporated in, one or more application-specific integrated circuits (ASICs) and/or one or more field programmable gate arrays (FPGAs).

Persistent storage device 620 and main memory device 630 each comprise a tangible non-transitory computer readable storage medium. Persistent storage device 620, and main memory device 630, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 690 may include peripherals, such as a printer, scanner, display screen, etc. For example, input/output devices 690 may include a display device such as a cathode ray tube (CRT), plasma or liquid crystal display (LCD) monitor for displaying information to a user, a keyboard, and a pointing device such as a mouse or a trackball by which the user can provide input to apparatus 600.

Any or all of the functions of the systems and apparatuses discussed herein may be performed by processor 610, and/or incorporated in, an apparatus or a system such as LiDAR system 300. Further, LiDAR system 300 and/or apparatus 600 may utilize one or more neural networks or other deep-learning techniques performed by processor 610 or other systems or apparatuses discussed herein.

One skilled in the art will recognize that an implementation of an actual computer or computer system may have other structures and may contain other components as well, and that FIG. 6 is a high-level representation of some of the components of such a computer for illustrative purposes.

FIGS. 7-10 illustrate various example locations of a vehicle to which a camera can be mounted to or integrated with. While FIGS. 7-10 use cameras as examples, it is understood that various embodiments of a compact perception device provided in this disclosure can also be mounted to, or integrated with, a vehicle at the illustrated locations or any other desired locations. Further, a compact perception device provided in this disclosure can also be mounted to, or integrated with, other moveable or stationary platforms, such as a drone, a ship, an airplane, a motorcycle, an infrastructure, a roadside structure, a parking structure, or the like.

Figure 7:
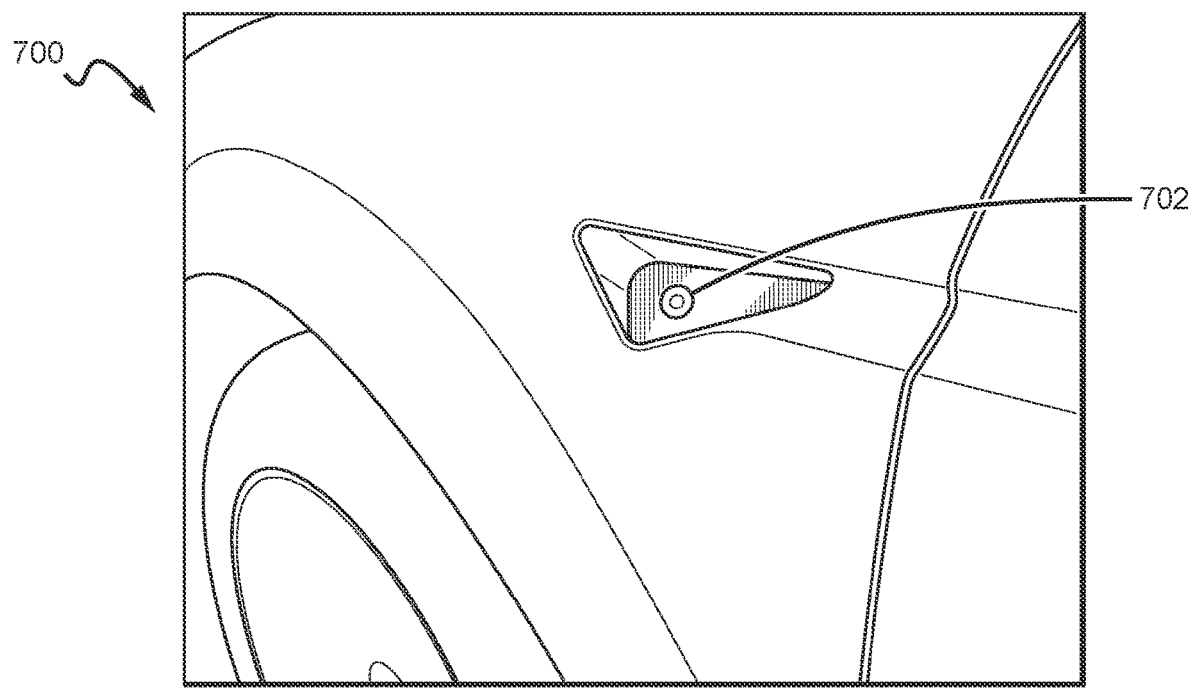
FIG. 7 illustrates a side view camera mounted to a front side of a vehicle in accordance with one embodiment of the present disclosure.

FIG. 7 illustrates a side view camera 702 mounted to the left front side (driver side) of a vehicle 700 in accordance with one embodiment of the present disclosure. As shown in FIG. 7, in one embodiment, the side view camera 702 can be positioned on a side of vehicle 700 above a fender of the front left tire. Camera 702 can be used to capture images and videos of a field-of-view (FOV) extending, for example, from a side area of the vehicle to an area behind the vehicle. As a result, camera 702 can provide data associated with the objects (e.g., traffic, pedestrians, bicycles, etc.) in an area surrounding the vehicle. While FIG. 7 illustrates that camera 702 is located at the left front side of the vehicle, it is understood that one or more cameras can be mounted to, or integrated with, the vehicle at its right front side to capture images or videos of objects located on the other side of the vehicle.

Figure 8:
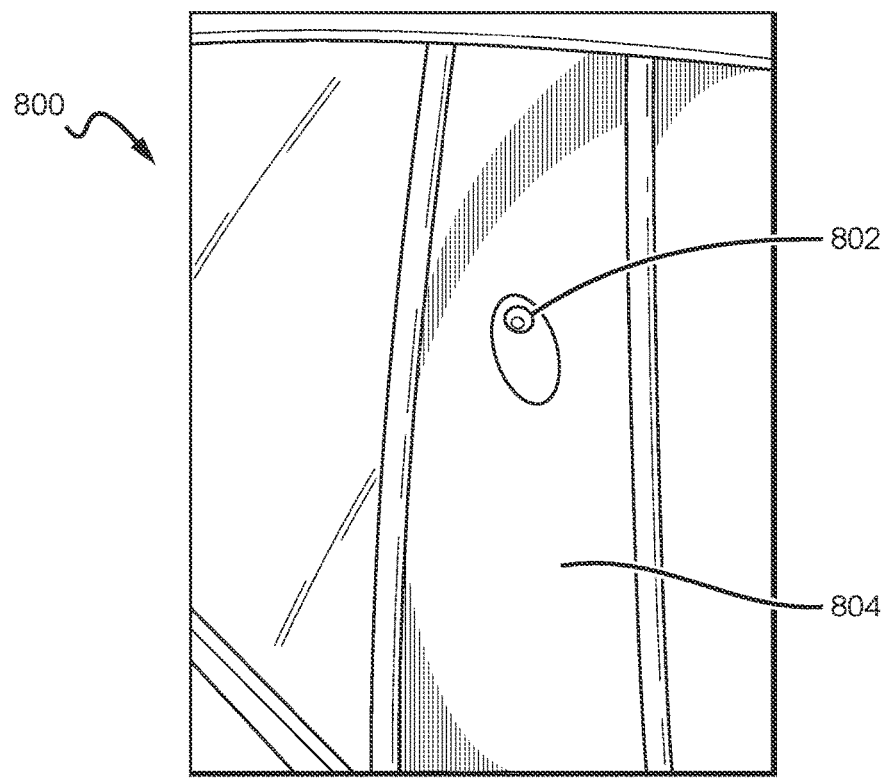
FIG. 8 illustrates a side view camera mounted to a door frame of a vehicle in accordance with one embodiment of the present disclosure.

FIG. 8 illustrates a side view camera 802 mounted to a door frame 804 of a vehicle 800 in accordance with one embodiment of the present disclosure. In some embodiments, camera 802 can be used to capture images and videos of a FOV extending, for example, from a side area of the vehicle to an area in front of the vehicle. As a result, camera 802 can provide image data associated with the objects (e.g., traffic, pedestrians, bicycles, etc.) in an area surrounding the vehicle. In some embodiments, the FOV captured by camera 802 can be different from the FOV captured by camera 702 as described above in FIG. 7. The two FOVs may or may not overlap with each other.

Figure 9:
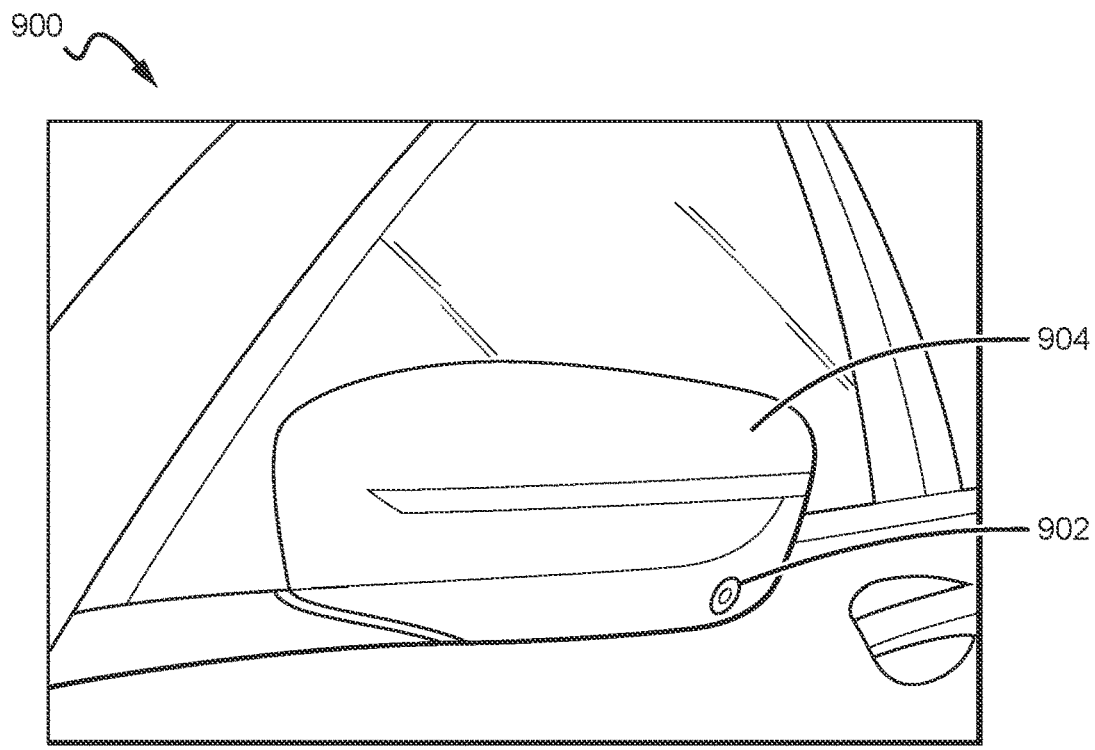
FIG. 9 illustrates a surround view camera mounted to a side rear view mirror of a vehicle in accordance with one embodiment of the present disclosure.
Figure 10:
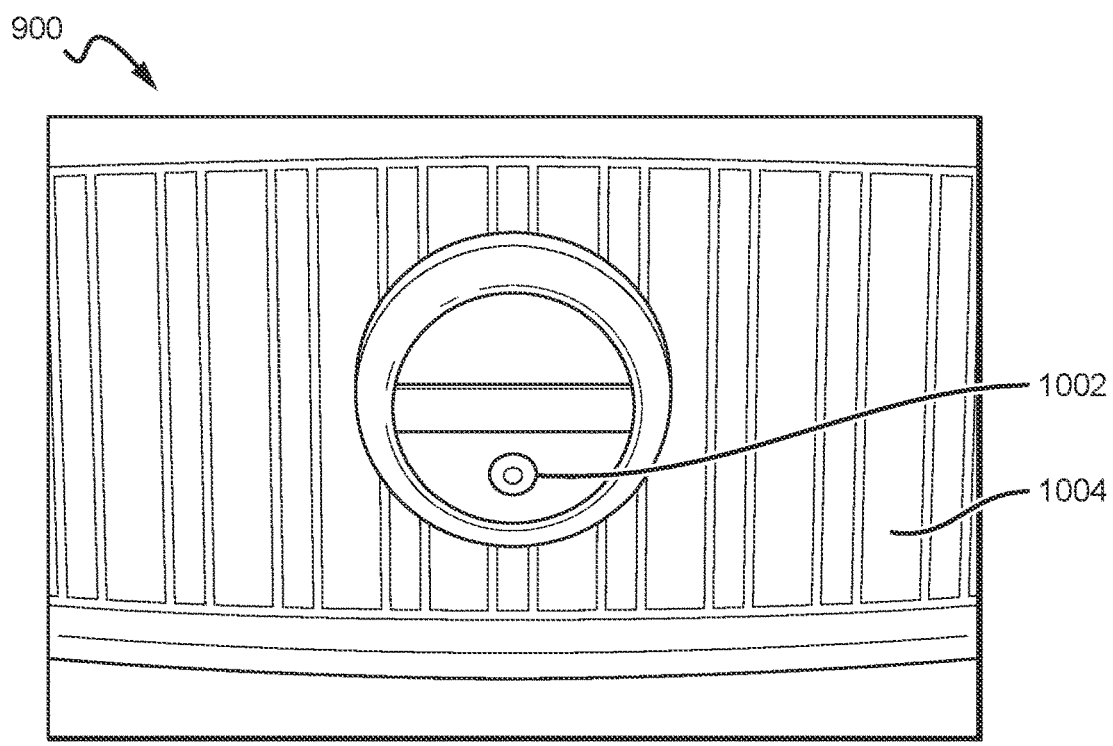
FIG. 10 illustrates a surround view camera mounted to a front grille or a front bumper of a vehicle in accordance with one embodiment of the present disclosure.

FIG. 9 illustrates a surround-view camera 902 mounted to a side rear view mirror 904 of a vehicle 900 in accordance with one embodiment of the present disclosure. FIG. 10 illustrates another surround-view camera 1002 mounted to a front grille 1004 or a front bumper of vehicle 900. In some embodiments, cameras 902 and 1002, with or without other surround-view cameras mount to the vehicle 900, can be used to provide a bird's eye view of the vehicle. Such a bird's eye view of the vehicle can be useful to assist parking of the vehicle. In one embodiment, vehicle 900 may be mounted with 4-6 surround-view cameras. For example, vehicle 900 can include camera 902 mounted to a rear-view mirror, another camera (not shown) mounted to the other rear-view mirror, camera 1002 mounted to the front grille 1004, and another camera (not shown) mounted to the rear bumper. At least some of these surround-view cameras are wide-angle cameras.

The surround-view cameras can be configured to capture images and videos of their respective FOVs. For instance, camera 902 captures images and/or videos of an FOV at the left side of vehicle 900; camera 1002 captures images and/or videos of another FOV in front of vehicle 900; another camera captures images and/or videos of another FOV at the right side of vehicle 900; and another camera captures images and/or videos of another FOV behind the vehicle 900. Image and/or video signals generated by the surround-view cameras can then be transmitted to a processor. The processor is configured to analyze and combine the signals from different surround-view cameras to provide a synthesized bird's eye view of the vehicle.

Figure 11:
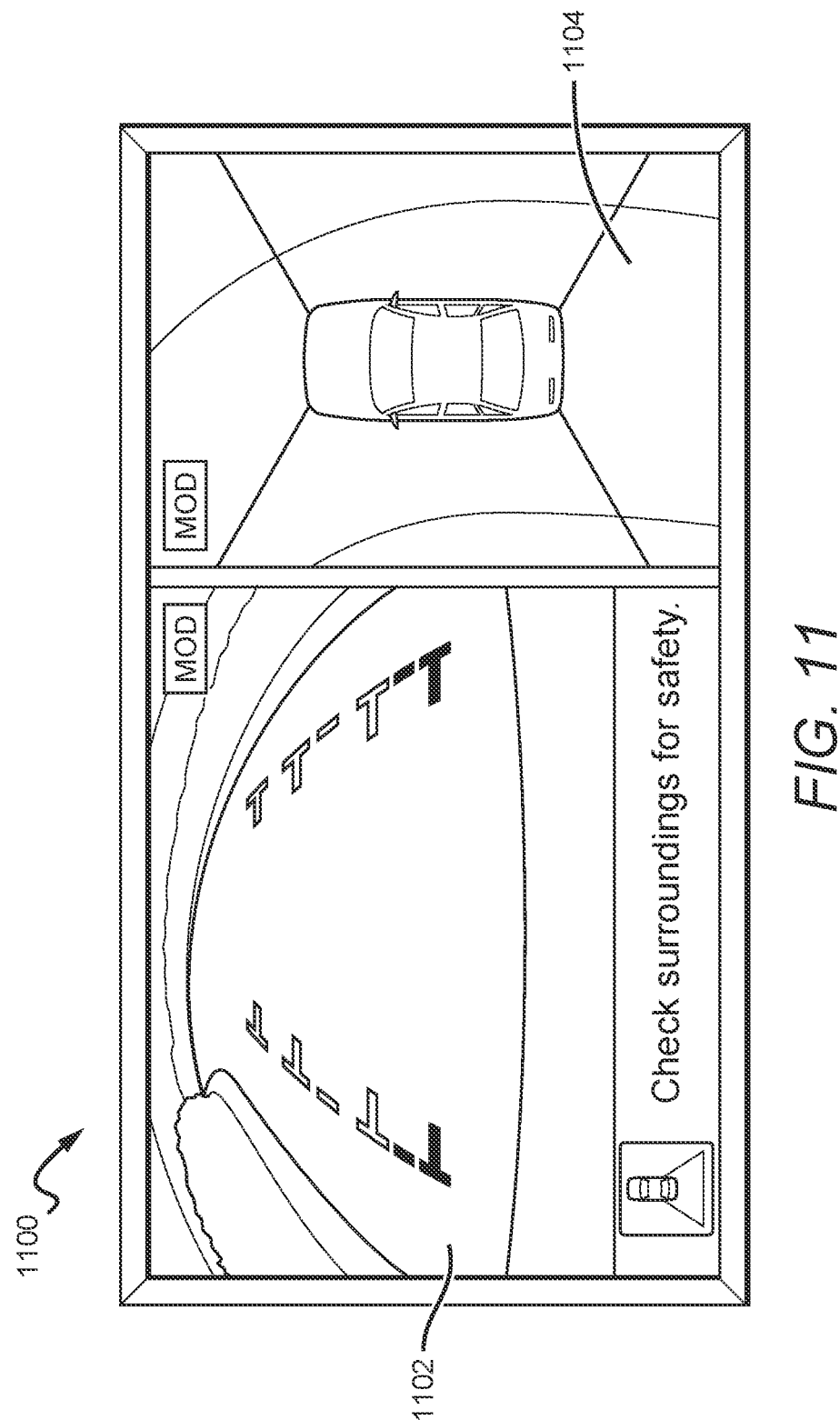
FIG. 11 illustrates an exemplary vehicle dashboard display based on data provided by one or more surround-view cameras mounted to a vehicle in accordance with one embodiment of the present disclosure.

FIG. 11 illustrates an exemplary vehicle dashboard display 1100 based on data provided by one or more surround-view cameras mount to the vehicle according to one embodiment of the present disclosure. As illustrated in FIG. 11, the right side of display 1100 shows an example bird's eye view image 1104 synthesized using data provided by the surround-view cameras mounted to the vehicle (e.g., cameras 902 and 1002 shown in FIGS. 9 and 10). The left side of display 1100 shows an image 1102 of an FOV behind the vehicle.

As described above, cameras 702, 802, 902, and 1002 shown in FIGS. 9-11 are mounted to, or integrated with, a vehicle. While FIGS. 7-10 uses cameras as illustration, various embodiments of a compact perception device provided in this disclosure can also be mounted to, or integrated with, a vehicle at the illustrated locations. The compact perception device may include at least a portion of a LiDAR device to provide depth data of an FOV and at least a portion of a camera to provide image data of the FOV. The compact perception device described herein can be configured to fit into any of the above-described locations of a vehicle, and/or any other desired locations (e.g., a pillar, a front or rear end bumper, a rear-view mirror, a fender, a roof, a door frame, a vehicle corner, etc.).

Figure 12:
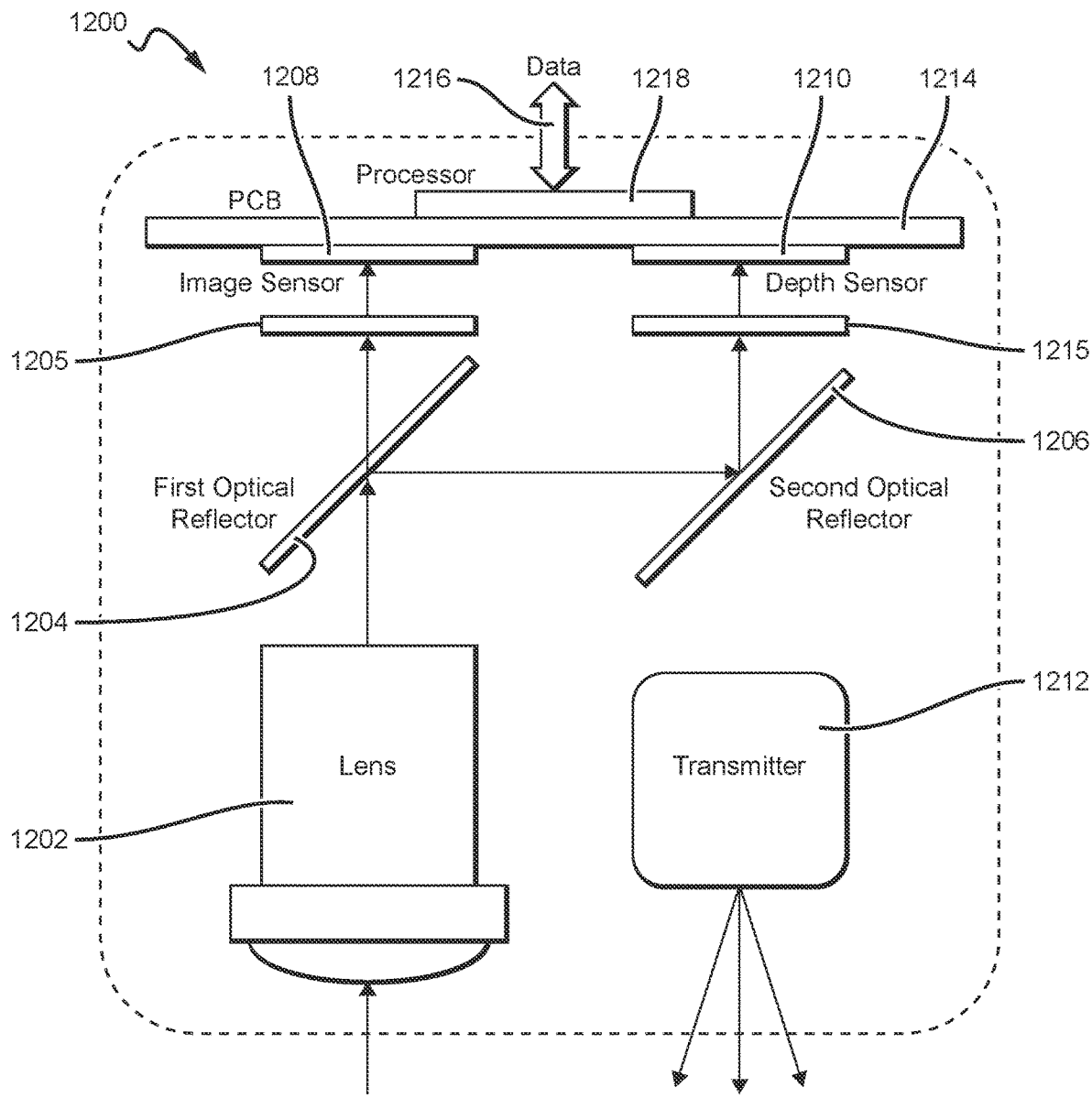
FIG. 12 is a block diagram illustrating an example compact perception device in accordance with some embodiments of the present disclosure.

FIG. 12 is a block diagram illustrating an example compact perception device 1200 according to some embodiments of the present disclosure. Device 1200 comprises a lens 1202, a first optical reflector 1204, a second optical reflector 1206, an image sensor 1208, a depth sensor 1210, a transmitter 1212, a printed circuit board (PCB) 1214, a data bus 1216, and a processor 1218. As shown in FIG. 12, transmitter 1212 is configured to emit laser light to an FOV external to compact perception device 1200. Transmitter 1212 can be implemented by one or more of laser source 310, transmitter 320, steering mechanism 340, and control circuitry 350 as described above. For example, transmitter 1212 can include at least a part of a flash LiDAR device, at least a part of a scanning LiDAR device, or any type of device that emits laser light. Transmitter 1212 can perform optical, mechanical, and/or electrical steering of laser light to the FOV. For instance, transmitter 1212 can include at least one solid state based LiDAR device configured to perform electronic scanning. Transmitter 1212 may also include a LiDAR device configured to perform optical scanning using one or more optical components such as polygon mirror, oscillation mirror, and/or other steering mechanisms described above. Transmitter 1212 can be configured to perform scanning in one or two dimensions.

In one embodiment, the laser light emitted by transmitter 1212 comprises near infrared range (NIR) light or infrared light. The light may be continuous wave light or pulsed laser light. Near infrared light is electromagnetic radiation with a wavelength that lies between about 780 to about 950 nm and is invisible to the human eye. It is understood that the laser light emitted by transmitter 1212 can comprise infrared light having wavelengths from 780 nm to 1 mm. While the below descriptions use NIR light as an illustration, it is further understood that the descriptions also apply to infrared light and/or light having wavelengths other than the visible light.

With continued reference to FIG. 12, the laser light emitted from transmitter 1212 may be reflected or scattered by one or more objects in an FOV (not shown). The reflected or scattered light forms return light, similar to those shown in FIGS. 5A-5C. The return light has substantially the same wavelength as the emitted light. Thus, in one embodiment, the return light is also NIR light. The return light can be collected by lens 1202.

In addition to collecting NIR light, lens 1202 can also be configured to collect visible light. The visible light can have a wavelength range of about 380 nm to about 750 nm. Lens 1202 may be configured such that it can collect both visible light and NIR light. For example, the focal length of lens 1202 can be configured to accommodate the slightly longer wavelength of the NIR light as compared to the visible light. In some examples, lens 1202 may include one or more lens or a lens group. Some of the lenses in the lens group may be optimized for focus the visible light, and some other lenses in the lens group may be optimized for focus the NIR light. The lens in the lens group may thus have different focal lengths.

As shown in FIG. 12, both visible light and NIR light are directed from lens 1202 to first optical reflector 1204. While FIG. 12 shows that first optical reflector 1204 is directly coupled to lens 1202, it is understood that one or more additional optical components may be disposed between lens 1202 and first optical reflector 1204 to redirect light as desired. In one example, first optical reflector 1204 can be located based on the NIR light focal length of lens 1202 such that the collected NIR light is focused onto first optical reflector 1204. Lens 1202 can further be configured such that the visible light, or a substantial portion of it, passes through first optical reflector 1204 and focuses onto image sensor 1208. In some examples, device 1200 further comprises a lens group 1205 and a lens group 1215 for correcting optical aberration caused by different wavelengths. Each of lens groups 1205 and 1215 may include any combination of one or more lens (e.g., convex lens, concave lens, spherical lens, aspherical lens, wide angle lens, etc.). For example, the visible light directed by lens 1202, due to its shorter wavelength, may refract more than the NIR light. Therefore, the visible light passing through lens 1202 may not be focused properly onto image sensor 1205. Lens group 1205 can be positioned between first optical reflector 1204 and image sensor 1205 to properly focus the visible light to image sensor 1208.

In one embodiment, first optical reflector 1204 can be configured to reflect a substantial portion of the NIR light directed by lens 1202 and pass a substantial portion of the visible light directed by lens 1202. One example of first optical reflector 1204 is a dichroic mirror that has significant different reflection or transmission properties at two different wavelengths. A dichroic mirror can pass a substantial portion of light having one wavelength and reflect a substantial portion of light having another wavelength. For example, first optical reflector 1204 can be primarily an infrared mirror having metallic coatings such as Aluminum, Silver, or Gold, for reflecting a substantial portion of the NIR light. First optical reflector 1204 can further have protective coatings such as SiO or SiO2. In some examples, first optical reflector 1204 may also have a layer of anti-reflection coating to allow the visible light to pass through. The AR coating may be provided at a certain area (e.g., center area) or all areas of first optical reflector 1204. The AR coating may be configured according to the visible light wavelength. First optical reflector 1204 can also be a partial reflection mirror.

As shown in FIG. 12, the visible light passes through first optical reflector 1204 and is directed to image sensor 1208 (e.g., via lens set 1205). Image sensor 1208 can be a complementary metal oxide semiconductor (CMOS) image sensor or a CCD image sensor. The image sensor 1208 detects the visible light signals and converts the light signals to electrical signals. The collected NIR light, or a substantial portion thereof, is reflected from first optical reflector 1204 to a second optical reflector 1206. Second optical reflector 1206 can reflect light that is directed by first optical reflector 1204 to a depth sensor 1210. In this case, second optical reflector 1206 reflects the NIR light toward depth sensor 1210. In some examples, the NIR light redirected by second optical reflector 1206 may not be properly focused on depth sensor 1210. A lens group 1215 may be disposed between second optical reflector 1206 and depth sensor 1210 to properly focus the NIR light onto depth sensor 1210. Second optical reflector 1206 can also be an infrared mirror having metallic coatings such as Aluminum, Silver, or Gold, for reflecting a substantial portion of the NIR light. It is understood that while FIG. 12 shows that the NIR light is reflected by first optical reflector 1204 to second optical reflector 1206 directly, one or more additional optics may be disposed in between to redirect light as desired. Similarly, one or more additional optics may be disposed in between second optical reflector 1206 and depth sensor 1210.

Depth sensor 1210 is configured to detect the NIR light reflected by first optical reflector 1204 and directed by second optical reflector 1206. Depth sensor 1210 can include any of the detector described above. For example, depth sensor 1210 can include a PIN based light detector structure, a APD (avalanche photodiode) based structure, a PMT (photomultiplier tube) based structure, a SiPM (Silicon photomultiplier) based structure, a SPAD (single-photon avalanche diode) base structure, and/or quantum wires. For material systems used in a depth sensor 1210, Si, InGaAs, and/or Si/Ge based materials can be used. Depth sensor 1210 converts NIR light signals to electrical signals.

With reference still to FIG. 12, the receiving paths for visible light and for NIR light are partially shared by using a same lens 1202 (or a lens group), first optical reflector 1204, and second optical reflector 1206. Further, image sensor 1208 and depth sensor 1214 can be mounted to the same printed circuit board (PCB) 1214. Image sensor 1208 converts visible light to electrical signals for generating a camera image and therefore functions as a camera. Depth sensor 1214 converts NIR light to electrical signals for generating a 3D point cloud and therefore functions as a LiDAR device. Accordingly, by sharing many of the components for generating both a camera image and a LiDAR point cloud, the entire perception device 1200 can be very compact in size. Moreover, by using a same lens 1202 to collect both visible light and NIR light, the FOVs for both image sensor 1208 and depth sensor 1214 are substantially the same. Accordingly, this reduces or eliminates the requirement to perform calibration between the depth sensor 1214 and the image sensor 1208. As a result, the complexity of data fusion between data generated by the two sensors is greatly reduced. The images captured by the image sensor 1208 and the depth sensor 1214 can be naturally matched by this configuration.

As described above, image sensor 1208 generates image data using visible light collected by lens 1202 and passed by first optical reflector 1204. Depth sensor 1210 generates depth data using NIR light collected by lens 1202 and reflected by both first optical reflector 1204 and second optical reflector 1206. Image data may represent the 2-dimensional view of the FOV and include color information (red, green blue, or RGB). Depth data may represent a 3-dimension view of the FOV by including distance measurement (also referred to as depth).

With reference to still to FIG. 12, in some embodiments, compact perception device 1200 further includes an electrical circuitry comprising a PCB 1214. A processor 1218 can be mounted on PCB 1214 (on the same side as the image sensor 1208 and depth sensor 1210, or on a different side of PCB). Electrical wires can be routed from image sensor 1208 and depth sensor 1210 to processor 1218. In one embodiment, a single processor 1218 can be used to combine the image data and the depth data, thereby making the perception device 1200 more compact. Compared to using a separate camera device and a separate LiDAR device, which may include their own processors, compact perception device 1200 improves the processing efficiency and reduces processing power consumption. The output data from processor 1218 can be fused or merged data that include both color information and depth information of the FOV (e.g., red, green, blue, and depth data, or RGBD data). As shown in FIG. 12, in one embodiment, the output data from processor 1218 can be communicated to a data bus 1216, which delivers the data to other systems for further processing.

In some embodiments, at least a part of compact perception device 1200 is steerable. For example, transmitter 1212 and/or lens 1202 may be steerable to better direct light to, and collect light from, a desired FOV. In some embodiments, the entire compact perception device 1200 is steerable to improve the light collection efficiency. For example, compact perception device 1200 may be placed on a moveable platform that is configured to move and/or rotate at any directions and/or angles.

Figure 13:
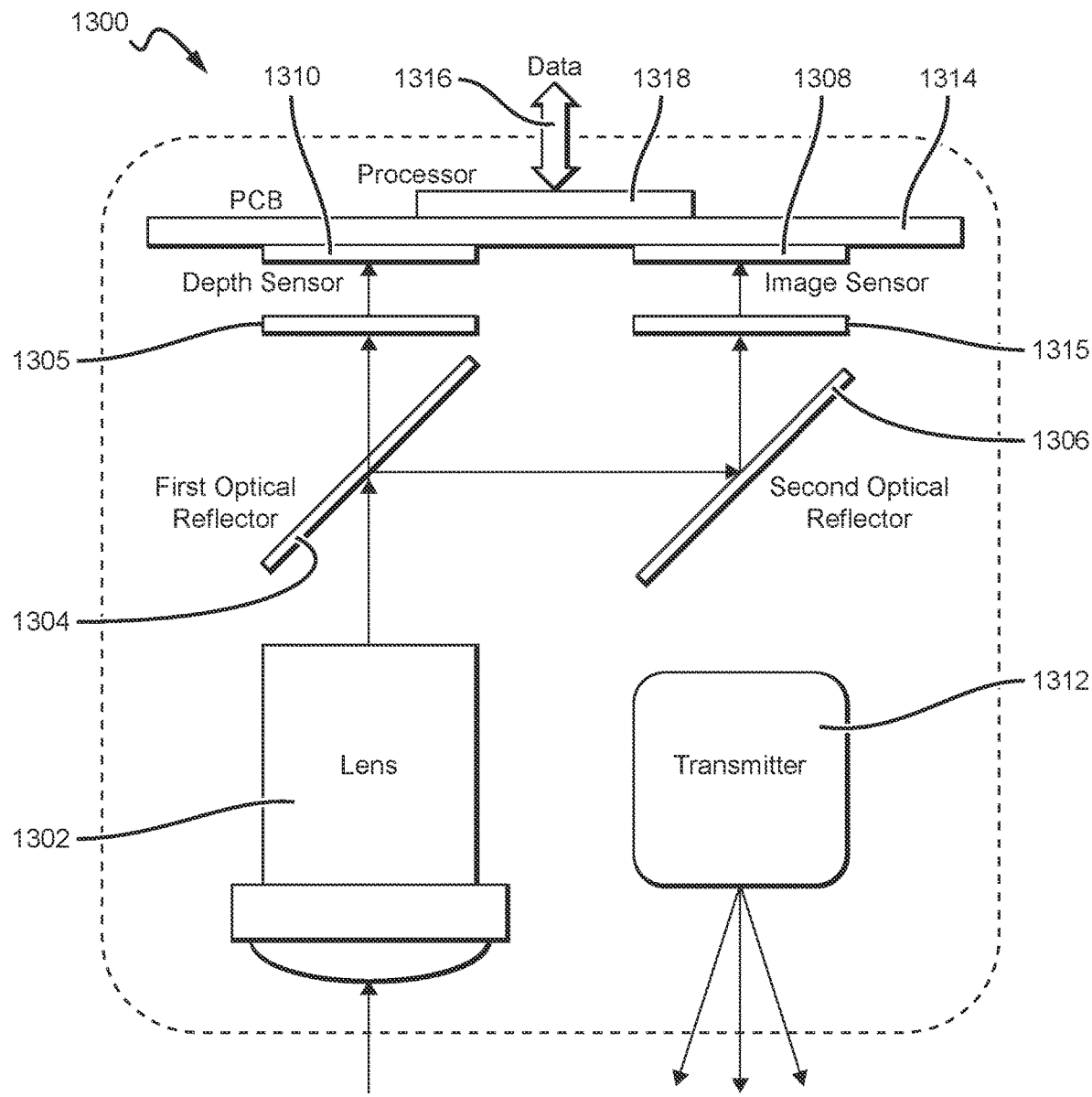
FIG. 13 is a block diagram illustrating another example compact perception device in accordance with one embodiment of the present disclosure.
Figure 14:
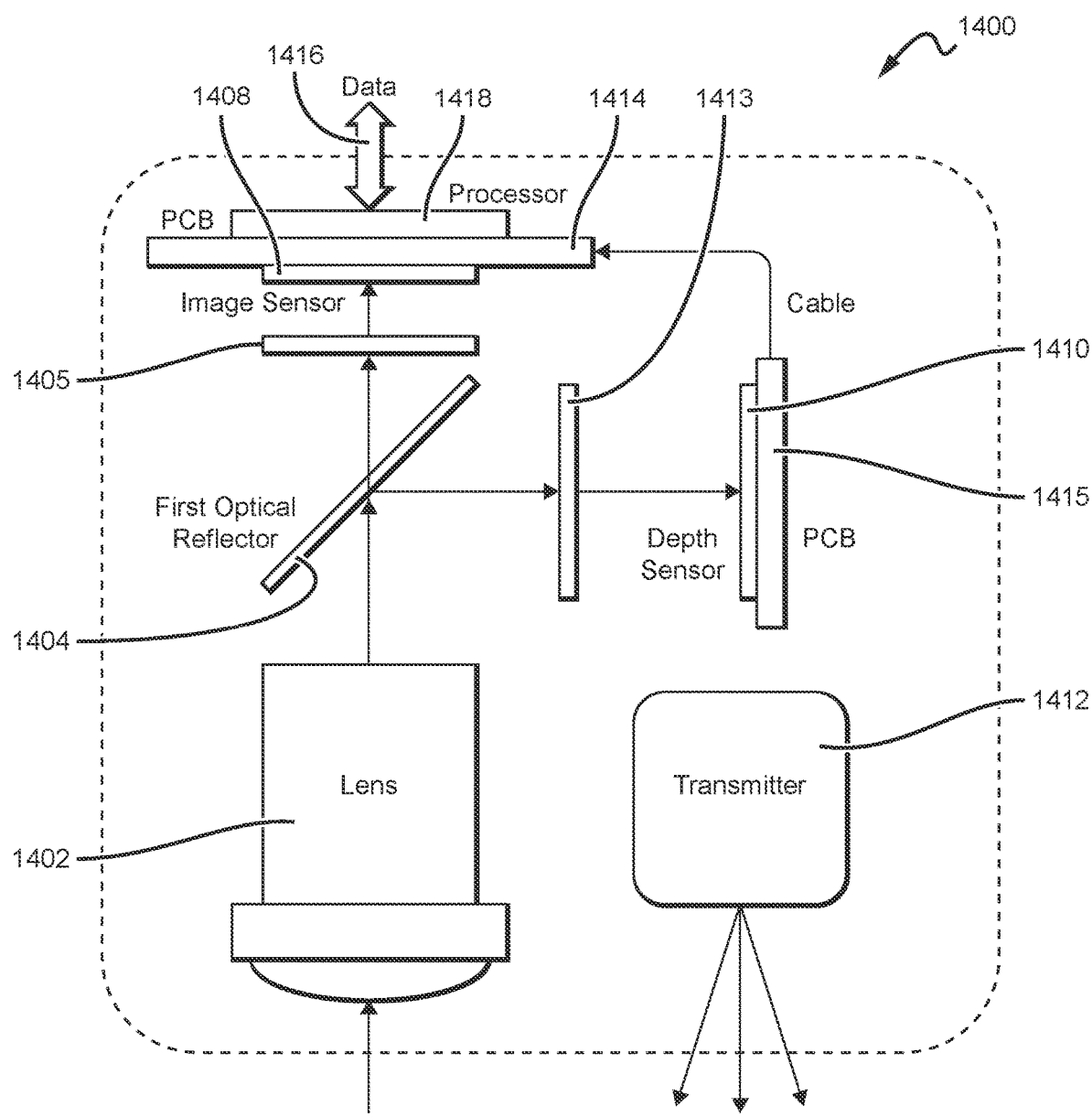
FIG. 14 is a block diagram illustrating another example compact perception device in accordance with one embodiment of the present disclosure.

As described above and shown in FIG. 12, in device 1200, first optical reflector 1204 passes the visible light and reflects the NIR light. FIGS. 13 and 14 illustrate certain alternative configurations. For example, FIG. 13 shows a compact perception device 1300, which has a different configuration than device 1200. Similar to device 1200, device 1300 also includes a lens 1302, a first optical reflector 1304, a second optical reflector 1306, an image sensor 1308, a depth sensor 1310, a transmitter 1312, a printed circuit board (PCB) 1314, a data bus 1316, and a processor 1318. Image sensor 1308, depth sensor 1310, transmitter 1312, printed circuit board (PCB) 1314, data bus 1316, and processor 1318 can be substantially the same or similar to their counterparts shown in FIG. 12, and are thus not repeatedly described.

In the configuration shown in FIG. 13, first optical reflector 1304 passes the collected NIR light and reflects the collected visible light. The NIR light is then directed to depth sensor 1310 and the visible light is directed to second optical reflector 1306. Second optical reflector 1306 reflects the visible light to image sensor 1308. Thus, compared to the configuration shown in FIG. 12, the two optical reflectors shown in FIG. 13 are essentially swapped in position with each other. Correspondingly, the image sensor and depth sensor of device 1300 are also swapped in position.

In the configuration shown in FIG. 13, first optical reflector 1304 can be located based on the visible light focal length of lens 1302 such that the visible light is focused onto first optical reflector 1304. Lens 1302 can further be configured such that the NIR light, or a substantial portion of it, passes through first optical reflector 1304 and focuses on depth sensor 1310. Similar to described above, lens 1302 can also include a lens group with one or more lens optimized for focusing visible light and one or more other lenses optimized for focusing the NIR light. In some examples, similar to device 1200, device 1300 may further comprises a lens group 1305 disposed between first optical reflector 1304 and depth sensor 1310, and/or another lens group 1315 disposed between second optical reflector 1306 and image sensor 1308 for correcting optical aberration caused by different wavelengths. Each of these lens groups 1305 and 1315 may include any combination of one or more lens (e.g., convex lens, concave lens, spherical lens, aspherical lens, wide angle lens, etc.).

For the configuration in FIG. 13, as described above, first optical reflector 1304 can be configured to reflect a substantial portion of the visible light directed by lens 1302 and pass a substantial portion of the NIR light directed by lens 1302.

One example of first optical reflector 1304 is a dichroic mirror that has significant different reflection or transmission properties at two different wavelengths. For example, first optical reflector 1304 can be primarily a visible light mirror while being substantially transparent to NIR light having longer wavelength. In some examples, first optical reflector 1304 may also have a layer of NIR anti-reflection coating to allow the NIR light to pass through. The NIR AR coating may be provided in certain (e.g., center area) or all areas of first optical reflector 1304. First optical reflector 1304 can also be a partial reflection mirror.

In the embodiments shown in FIGS. 12 and 13, both the depth sensor and the image sensor are coupled to the same printed circuit board (PCB). An alternative configuration is shown in FIG. 14. FIG. 14 illustrates a compact perception device 1400, which includes a lens 1402, a first optical reflector 1404, an image sensor 1408, a depth sensor 1410, a transmitter 1412, a first printed circuit board (PCB) 1414, a data bus 1416, a second PCB 1415, and a processor 1418. Lens 1402, first optical reflector 1404, image sensor 1408, depth sensor 1410, transmitter 1412, first PCB 1414, data bus 1416, and processor 1418 can be substantially the same or similar to their counterparts shown in FIGS. 12 and 13, and are thus not repeatedly described.

In this embodiment shown in FIG. 14, first optical reflector 1404 reflects a substantial portion of NIR light directed by lens 1402. The reflected NIR light is directed to depth sensor 1410 directly, without the need of a second optical reflector. Depth sensor 1410 is mounted to a second PCB 1415. In some examples, second PCB 1415 can be a separate and distinct PCB from first PCB 1414. Thus, image sensor 1408 and depth sensor 1410 are not mounted to the same PCB or aligned at the same plane. Instead, they can be positioned to be perpendicular to each other or at any other desired angles with respect to each other. Image sensor 1408 and depth sensor 1410 may be coupled to separate PCBs or may be coupled to a single flexible PCB. In this embodiment, a cable, or a flexible PCB, may connect the two PCBs 1414 and 1415 such that data can be transmitted between them. In some examples, similar to those shown in FIG. 12, device 1400 further comprises a lens group 1405 and a lens group 1413 for correcting optical aberration caused by different wavelengths. Each of lens groups 1405 and 1413 may include any combination of one or more lens (e.g., convex lens, concave lens, spherical lens, aspherical lens, wide angle lens, etc.). Lens group 1405 can facilitate to properly focus visible light onto image sensor 1408 and lens group 1413 can facilitate to properly focus the NIR light onto depth sensor 1410. It is understood that the embodiment shown in FIG. 14 can also be changed such that the first optical reflector 1404 reflects visible light, instead of NIR light. Correspondingly, depth sensor 1410 can be mounted to PCB 1414 and image sensor 1408 can be mounted to PCB 1415. Other configurations are also possible. The embodiment shown in FIG. 14 can further reduce the size of the compact perception device because it eliminates the second optical reflector.

While FIGS. 12-14 illustrate several embodiments of a compact perception device, it is understood that a compact perception device can have other configurations. For example, one or more optical reflectors, one or more PCBs, one or more processors may be used and/or configured differently. The lens can be placed at different positions depending on vehicle mounting location of the compact perception device. Moreover, in some embodiments, a compact perception device is disposed in a single housing. For example, the lens, the transmitter, optical reflector(s), PCB(s), processor(s), the image sensor, the depth sensor can all be packaged in a same housing. In other embodiments, some of the components may be separately packaged in a different housing and/or located at a different part of the vehicle to which the compact perception device is mounted.

Figure 15:
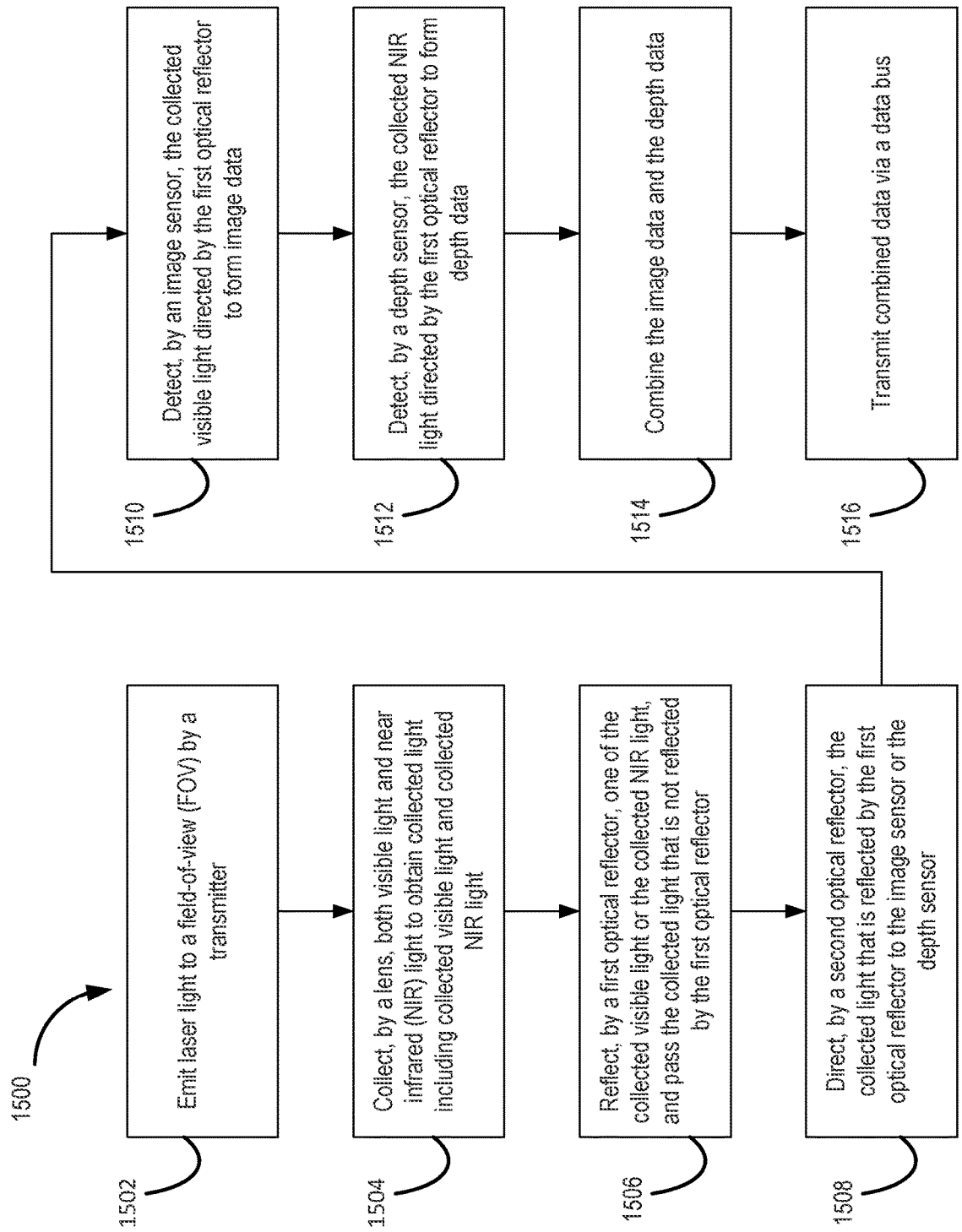
FIG. 15 is a flowchart illustrating a method performed by a compact perception device for perceiving an external environment in accordance with some embodiments of the present disclosure.

FIG. 15 is a flowchart illustrating an example method 1500 performed by a compact perception device for perceiving an external environment. Method 1500 can be performed by any of the compact perception device described above or any other alternative configurations without departing from the principle of the method steps. As shown in FIG. 15, in step 1502, a transmitter (e.g., transmitters 1212, 1312, or 1412) emits laser light to a field-of-view (FOV). The emitted laser light may be scattered or reflected by objects in the FOV. The scattered and reflected light form return light that can be collected by a lens of the compact perception device. The emitter laser light and the return light can be in the infrared wavelength range (e.g., NIR light).

In step 1504, a lens (e.g., lens 1202, 1302, or 1402) collects both visible light and near infrared (NIR) light to obtain collected light including collected visible light and collected NIR light. In some embodiments, the lens and/or other components of the compact perception device is steerable so that it can improve the collection efficiency of the device. In step 1506, a first optical reflector (e.g., 1204, 1304, or 1404) reflects one of the collected visible light or the collected NIR light, and pass the collected light that is not reflected by the first optical reflector.

In step 1508, a second optical reflector (e.g., reflector 1206 or 1306) directs the collected light that is reflected by the first optical reflector to the image sensor or the depth sensor. In one embodiment, the first optical reflector reflects the collected visible light and passes the collected the NIR light. The second optical reflector then reflects the collected visible light to the image sensor. This embodiment is shown in FIG. 13. In another embodiment, the first optical reflector reflects the collected NIR light and passes the collected visible light by the first optical reflector. The second optical reflector then reflects the collected NIR light to the depth sensor. This embodiment is shown in FIG. 12.

In step 1510, an image sensor detects the collected visible light directed by the first optical reflector to form image data. In step 1512, the collected NIR light directed by the first optical reflector to form depth data. In step 1514, an electrical circuitry coupled to the image sensor and depth sensor can combine the image data and the depth data. In one embodiment, combining the data includes encoding, by the electrical circuitry, the depth data and the image data into red, green, blue and depth (RGBD) data. The electrical circuitry may include one or more processors and one or more PCBs as shown in FIGS. 12-14.

In step 1516, the combined data is transmitted via a data bus to other systems (e.g., one or more sub-systems of vehicle perception and planning system 220) for further processing.

It is understood that steps shown in FIG. 15 are for illustration only. Some of the steps can be removed, reordered, and/or altered depending on the particular configurations or design requirements. Additional steps can be added to method 1500 without departing from the principle of the method.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A compact perception device, comprising:
a lens configured to collect both visible light and near infrared (NIR) light to obtain collected light including collected visible light and collected NIR light;
a first optical reflector optically coupled to the lens, the first optical reflector being configured to reflect one of the collected visible light or the collected NIR light, and pass the collected light that is not reflected by the first optical reflector;
an image sensor configured to detect the collected visible light directed by the first optical reflector to form image data;
a depth sensor configured to detect the collected NIR light directed by the first optical reflector to form depth data; and
electrical circuitry configured to combine the image data and the depth data, the electrical circuitry comprising a printed circuit board (PCB) coupled to the image sensor and the depth sensor.

2. The device of claim 1, further comprising a transmitter configured to emit laser light to a field-of-view (FOV), the NIR light collected by the lens being formed based on the emitted laser light.

3. The device of claim 2, wherein the transmitter comprises at least one of a solid state based light ranging and detection (LiDAR) device configured to perform electronic scanning or a LiDAR device configured to perform optical scanning.

4. The device of claim 1, further comprising a single housing enclosing the lens, the first optical reflector, the image sensor, and the depth sensor.

5. The device of claim 1, further comprising a second optical reflector optically coupled to the first optical reflector, the second optical reflector being configured to direct the collected light that is reflected by the first optical reflector.

6. The device of claim 5, wherein the first optical reflector is configured to reflect the collected visible light and pass the collected NIR light; and wherein the second optical reflector is configured to reflect the collected NIR light passed by the first optical reflector.

7. The device of claim 5, wherein the first optical reflector is configured to reflect the collected NIR light and pass the collected visible light; and wherein the second optical reflector is configured to reflect the collected visible light passed by the first optical reflector.

8. The device of claim 1, wherein at least a part of the compact perception device is steerable.

9. The device of claim 1, wherein the electrical circuitry further comprises a processor configured to encode the depth data and the image data into red, green, blue and depth (RGBD) data, and transmit the RGBD data externally via a data bus.

10. The device of claim 1, wherein the lens is configured to collect both the visible light and the NIR light from a same field-of-view (FOV).

11. A light detection and ranging (LiDAR) system comprising at least one compact perception device comprising:
a lens configured to collect both visible light and near infrared (NIR) light to obtain collected light including collected visible light and collected NIR light;
a first optical reflector optically coupled to the lens, the first optical reflector being configured to reflect one of the collected visible light or the collected NIR light, and pass the collected light that is not reflected by the first optical reflector;
an image sensor configured to detect the collected visible light directed by the first optical reflector to form image data;
a depth sensor configured to detect the collected NIR light directed by the first optical reflector to form depth data; and electrical circuitry configured to combine the image data and the depth data, the electrical circuitry comprising a printed circuit board (PCB) coupled to the image sensor and the depth sensor.

12. A vehicle comprising a light detection and ranging (LiDAR) system, the LiDAR system comprising at least one compact perception device, the compact perception device comprising:
a lens configured to collect both visible light and near infrared (NIR) light to obtain collected light including collected visible light and collected NIR light;
a first optical reflector optically coupled to the lens, the first optical reflector being configured to reflect one of the collected visible light or the collected NIR light, and pass the collected light that is not reflected by the first optical reflector;
an image sensor configured to detect the collected visible light directed by the first optical reflector to form image data;
a depth sensor configured to detect the collected NIR light directed by the first optical reflector to form depth data; and
electrical circuitry configured to combine the image data and the depth data, the electrical circuitry comprising a printed circuit board (PCB) coupled to the image sensor and the depth sensor.

13. A method performed by a compact perception device for perceiving an external environment, comprising:
collecting, by a lens, both visible light and near infrared (NIR) light to obtain collected light including collected visible light and collected NIR light;
reflecting, by a first optical reflector, one of the collected visible light or the collected NIR light, and passing the collected light that is not reflected by the first optical reflector;
detecting, by an image sensor, the collected visible light directed by the first optical reflector to form image data;
detecting, by a depth sensor, the collected NIR light directed by the first optical reflector to form depth data; and
combining the image data and the depth data by electrical circuitry comprising a printed circuit board (PCB) coupled to the image sensor and the depth sensor.

14. The method of claim 13, further comprising:
emitting laser light to a field-of-view (FOV) by a transmitter, the NIR light collected by the lens being formed based on the emitted laser light.

15. The method of claim 13, further comprising:
directing, by a second optical reflector, the collected light that is reflected by the first optical reflector to the image sensor or the depth sensor.

16. The method of claim 15, wherein reflecting, by the first optical reflector, one of the collected visible light or the collected NIR light, and passing the collected light that is not reflected by the first optical reflector comprises:
reflecting the collected visible light by the first optical reflector;
passing the collected NIR light by the first optical reflector; and
wherein directing the collected light that is reflected by the first optical reflector comprises reflecting, by the second optical reflector, the collected visible light to the image sensor.

17. The method of claim 15, wherein reflecting, by the first optical reflector, one of the collected visible light or the collected NIR light, and passing the collected light that is not reflected by the first optical reflector comprises:
reflecting the collected NIR light by the first optical reflector;
passing the collected visible light by the first optical reflector; and
wherein directing the collected light that is reflected by the first optical reflector comprises reflecting, by the second optical reflector, the collected NIR light to the depth sensor.

18. The method of claim 13, further comprising steering at least a part of the compact perception device.

19. The method of claim 13, further comprising transmitting the combined data via a data bus.

20. The method of claim 13, wherein combining the image data and the depth data comprises encoding, by the electrical circuitry, the depth data and the image data into red, green, blue and depth (RGBD) data.

21. The method of claim 13, wherein collecting both the visible light and the near infrared (NIR) light is from a same field-of-view.

22. A compact perception device, comprising:
a lens configured to collect both visible light and near infrared (NIR) light to obtain collected light including collected visible light and collected NIR light;
a first optical reflector optically coupled to the lens, the first optical reflector being configured to reflect one of the collected visible light or the collected NIR light, and pass the collected light that is not reflected by the first optical reflector;
an image sensor configured to detect the collected visible light directed by the first optical reflector to form image data;
a depth sensor configured to detect the collected NIR light directed by the first optical reflector to form depth data; and
electrical circuitry configured to combine the image data and the depth data, the electrical circuitry comprising a plurality of printed circuit boards (PCBs), wherein the image sensor and the depth sensor are electrically coupled to a respective PCB of the plurality of PCBs.

* * * * *

UNITED STATES PATENT AND TRADEMARK OFFICE
CERTIFICATE OF CORRECTION

Page 1 of 2

PATENT NO. : 11,871,130 B2
APPLICATION NO. : 18/105781
DATED : January 9, 2024
INVENTOR(S) : Haosen Wang and Yimin Li It is certified that error appears in the above-identified patent and that said Letters Patent is hereby corrected as shown below:

In the Specification

In Column 1, Lines 63-67: "The compact perception device includes a compact perception device. The device includes a lens configured to collect both visible light and near infrared (NIR) light to obtain collected light including collected visible light and collected NIR light." should read --The compact perception device includes a lens configured to collect both visible light and near infrared (NIR) light to obtain collected light including collected visible light and collected NIR light.--

In Column 5, Lines 6-9: "Cameras can capture a scene with brightness and color, while LiDAR devices can capture a scene the depth information so that the distance to an object can be calculated. Cameras are now widely used in advanced driver-assistance systems (ADAS)." should read --Cameras can capture a scene with brightness and color, while LiDAR devices can capture a scene with the depth information so that the distance to an object can be calculated. Cameras are now widely used in advanced driver-assistance systems (ADAS).--

In Column 8, Lines 32-37: "For example, sensor data from camera(s) 232, radar sensor(s) 234, ultrasonic sensor(s) 236, and/or other sensor(s) 238 may be correlated or fused with sensor data LiDAR system(s) 210, thereby at least partially offloading the sensor fusion process performed by vehicle perception and planning system 220." should read --For example, sensor data from camera(s) 232, radar sensor(s) 234, ultrasonic sensor(s) 236, and/or other sensor(s) 238 may be correlated or fused with sensor data from LiDAR system(s) 210, thereby at least partially offloading the sensor fusion process performed by vehicle perception and planning system 220.--

In Column 13, Lines 37-39: "Fiber-based light source 400 can also include other components not shown, such as one or more power connectors, power supplies, and/or power lines." should read --Fiber-based laser source 400 can also include other components not shown, such as one or more power connectors, power supplies, and/or power lines.--

In Column 18, Lines 31-34: "These communications paths represent communication (bidirectional or unidirectional) among the various LiDAR system components but need not be physical components Signed and Sealed this
Seventeenth Day of September, 2024

Katherine Kelly Vidal
*Director of the United States Patent and Trademark Office* themselves." should read --These communications paths represent communication links (bidirectional or unidirectional) among the various LiDAR system components but need not be physical components themselves.--

In Column 29, Lines 30-31: "In step 1512, the collected NIR light directed by the first optical reflector to form depth data." should read --In step 1512, the collected NIR light directed by the first optical reflector is directed by a depth sensor to form depth data.--